(12) United States Patent
Arora et al.

(10) Patent No.: US 11,059,176 B2
(45) Date of Patent: Jul. 13, 2021

(54) METHOD AND SYSTEM FOR FACILITY MONITORING AND REPORTING TO IMPROVE SAFETY USING ROBOTS

(71) Applicant: Fetch Robotics, Inc., San Jose, CA (US)

(72) Inventors: Niharika Arora, San Jose, CA (US); Melonee Wise, San Jose, CA (US); Brian Cairl, Astoria, NY (US); Carl Saldanha, San Jose, CA (US); Robert Chatman, III, Campbell, CA (US); Levon Avagyan, San Jose, CA (US); Aaron Hoy, San Jose, CA (US); Stefan Nusser, Palo Alto, CA (US); David Dymesich, New York, NY (US); David Robson, San Jose, CA (US)

(73) Assignee: Fetch Robotics, Inc., San Jose, CA (US)

( * ) Notice: Subject to any disclaimer, the term of this patent is extended or adjusted under 35 U.S.C. 154(b) by 0 days.

(21) Appl. No.: 17/124,387

(22) Filed: Dec. 16, 2020

(65) Prior Publication Data

US 2021/0178595 A1    Jun. 17, 2021

Related U.S. Application Data

(60) Provisional application No. 62/948,440, filed on Dec. 16, 2019.

(51) Int. Cl.
*B25J 9/16* (2006.01)
*B25J 13/00* (2006.01)
*B25J 11/00* (2006.01)

(52) U.S. Cl.
CPC .......... *B25J 9/1674* (2013.01); *B25J 9/161* (2013.01); *B25J 9/1679* (2013.01); *B25J 9/1697* (2013.01); *B25J 11/008* (2013.01); *B25J 13/006* (2013.01); *G05D 2201/0207* (2013.01); *Y10S 901/08* (2013.01)

(58) Field of Classification Search
None
See application file for complete search history.

(56) References Cited

U.S. PATENT DOCUMENTS 10,933,528 B2 *  3/2021  Gordon ............... G05D 1/0055
10,950,119 B2 *  3/2021  Davies ................. H04L 67/22
(Continued)

*Primary Examiner* — Robert T Nguyen
(74) *Attorney, Agent, or Firm* — J. Steven Svoboda

(57) ABSTRACT

A system for facility monitoring and reporting to improve safety using one or more robots includes: a network; a plurality of autonomous mobile robots operating in a facility, the robots configured to monitor facility operation, the robots further configured to detect a predetermined critical condition, the robots operably connected to the network; a server operably connected to the robots over the network; and an individual robot operably connected to the server over the network, the individual robot operating in the facility, the robots not comprising the individual robot, the individual robot configured to monitor facility operation; wherein the robots are configured to regularly produce a regular report under normal operating conditions, the report displaying data received from the server, wherein the robots are further configured to produce to the server a critical condition report upon occurrence of the critical condition.

5 Claims, 33 Drawing Sheets

(56) References Cited

U.S. PATENT DOCUMENTS

| | | | |
|---|---|---|---|
| 2005/0171644 A1* | 8/2005 | Tani | G05D 1/0274 |
| | | | 700/253 |
| 2016/0266577 A1* | 9/2016 | Kerzner | G08B 13/19697 |
| 2017/0231446 A1* | 8/2017 | Watanabe | G08B 25/00 |
| | | | 15/319 |
| 2018/0279847 A1* | 10/2018 | Park | A47L 11/4011 |
| 2020/0009732 A1* | 1/2020 | Gordon | G05D 1/0055 |
| 2020/0053324 A1* | 2/2020 | Deyle | G01C 21/20 |
| 2020/0225673 A1* | 7/2020 | Ebrahimi Afrouzi | |
| | | | G05D 1/0214 |
| 2020/0319640 A1* | 10/2020 | Vogel | G05D 1/0212 |
| 2021/0012216 A1* | 1/2021 | Giovannini | G06N 5/02 |
| 2021/0046650 A1* | 2/2021 | Deyle | G05D 1/0274 |
| 2021/0048829 A1* | 2/2021 | Deyle | G05D 1/0246 |

* cited by examiner

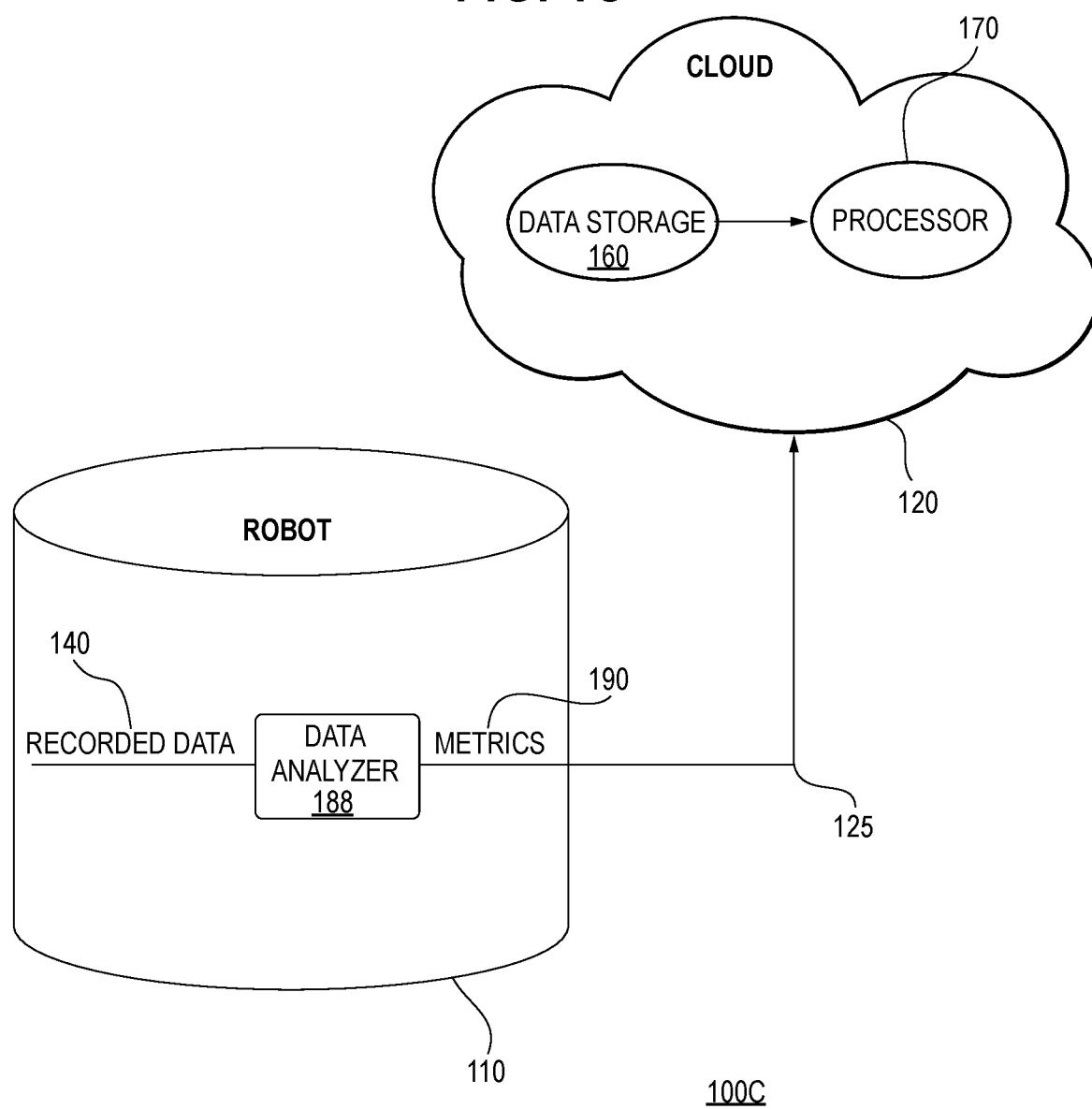

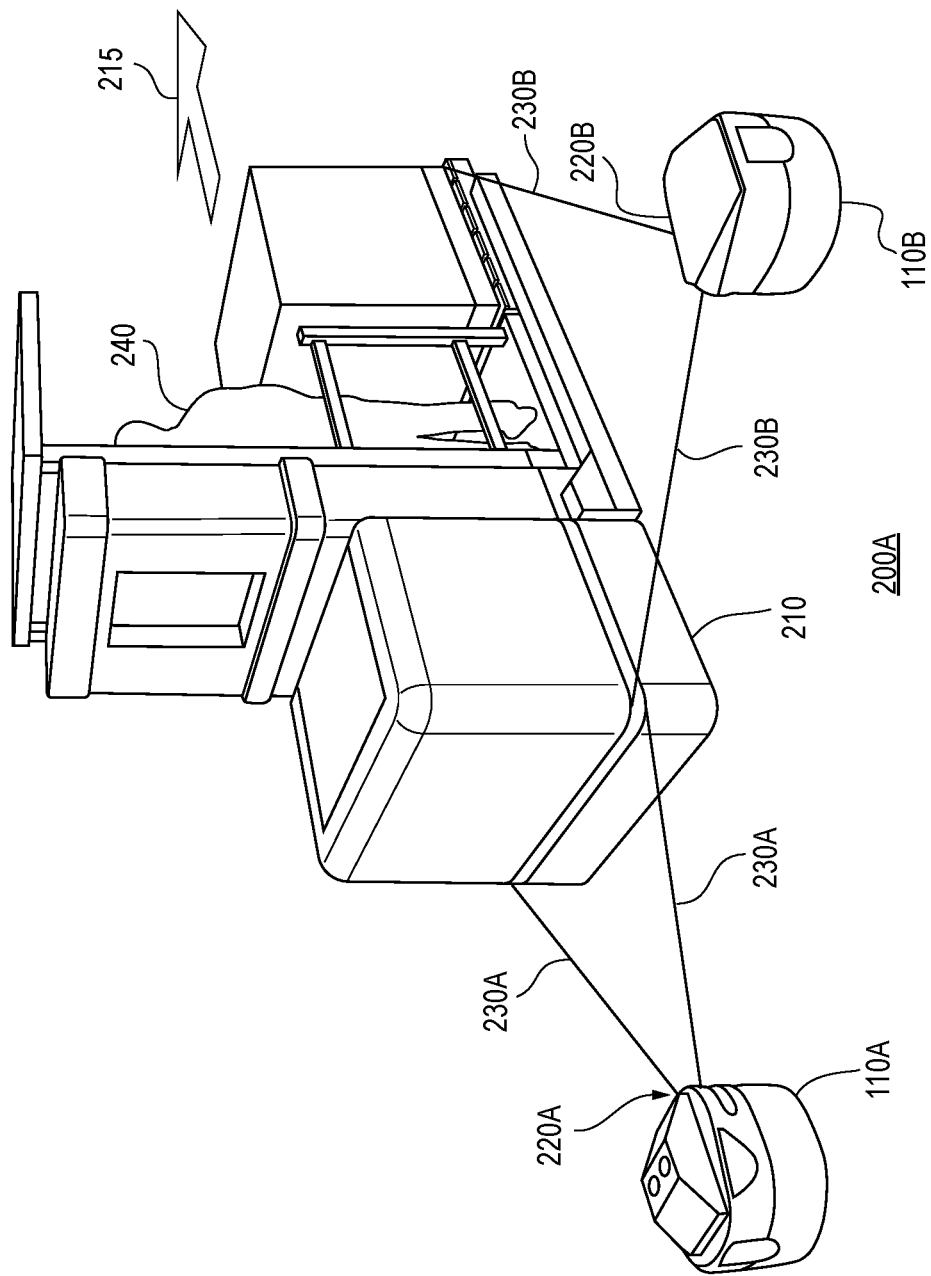

FIG. 4

410 — USING A SYSTEM COMPRISING A NETWORK, THE SYSTEM FURTHER COMPRISING A PLURALITY OF ROBOTS OPERATING IN A FACILITY, THE ROBOTS OPERABLY CONNECTED TO THE NETWORK, THE ROBOTS CONFIGURED TO MONITOR FACILITY OPERATION, THE ROBOTS FURTHER CONFIGURED TO DETECT A CRITICAL CONDITION, WHEREIN THE ROBOTS ARE FURTHER CONFIGURED TO GO INTO HIGH ALERT UPON DETECTION OF THE CRITICAL CONDITION, THE SYSTEM FURTHER COMPRISING A SERVER OPERABLY CONNECTED TO THE ROBOTS OVER THE NETWORK, WHEREIN THE ROBOTS ARE CONFIGURED TO REGULARLY PRODUCE TO THE SERVER A REGULAR REPORT UNDER NORMAL OPERATING CONDITIONS, WHEREIN THE ROBOTS ARE FURTHER CONFIGURED TO PRODUCE TO THE SERVER A CRITICAL CONDITION REPORT UPON OCCURRENCE OF THE CRITICAL CONDITION, THE SERVER RECEIVES, FROM A DETECTING ROBOT, A CRITICAL CONDITION DETECTED BY THE DETECTING ROBOT.

412 — THE SERVER REQUESTS DATA REGARDING THE CRITICAL CONDITION FROM A ROBOT.

415 — THE SERVER DISPLAYS, ON A USER INTERFACE (UI) VISIBLE TO A USER, THE UI OPERABLY CONNECTED TO THE SERVER, THE CRITICAL CONDITION.

420 — THE SERVER GENERATES A HEAT MAP OF THE CRITICAL CONDITION.

425 — THE SERVER GENERATES A PATH USABLE BY THE ROBOTS AROUND THE CRITICAL CONDITION.

430 — THE SERVER SWITCHES THE DETECTING ROBOT FROM PERIODIC, LOWER-PRIORITY DATA RECORDING, TO HIGH-PRIORITY, REAL-TIME, CONTINUOUS DATA RECORDING AND DIRECT UPLOADING.

435 — THE SERVER SENDS THE CRITICAL CONDITION TO ONE OR MORE OTHER ROBOTS.

440 — THE SERVER REQUESTS ASSISTANCE FOR THE DETECTING ROBOT FROM THE OTHER ROBOTS.

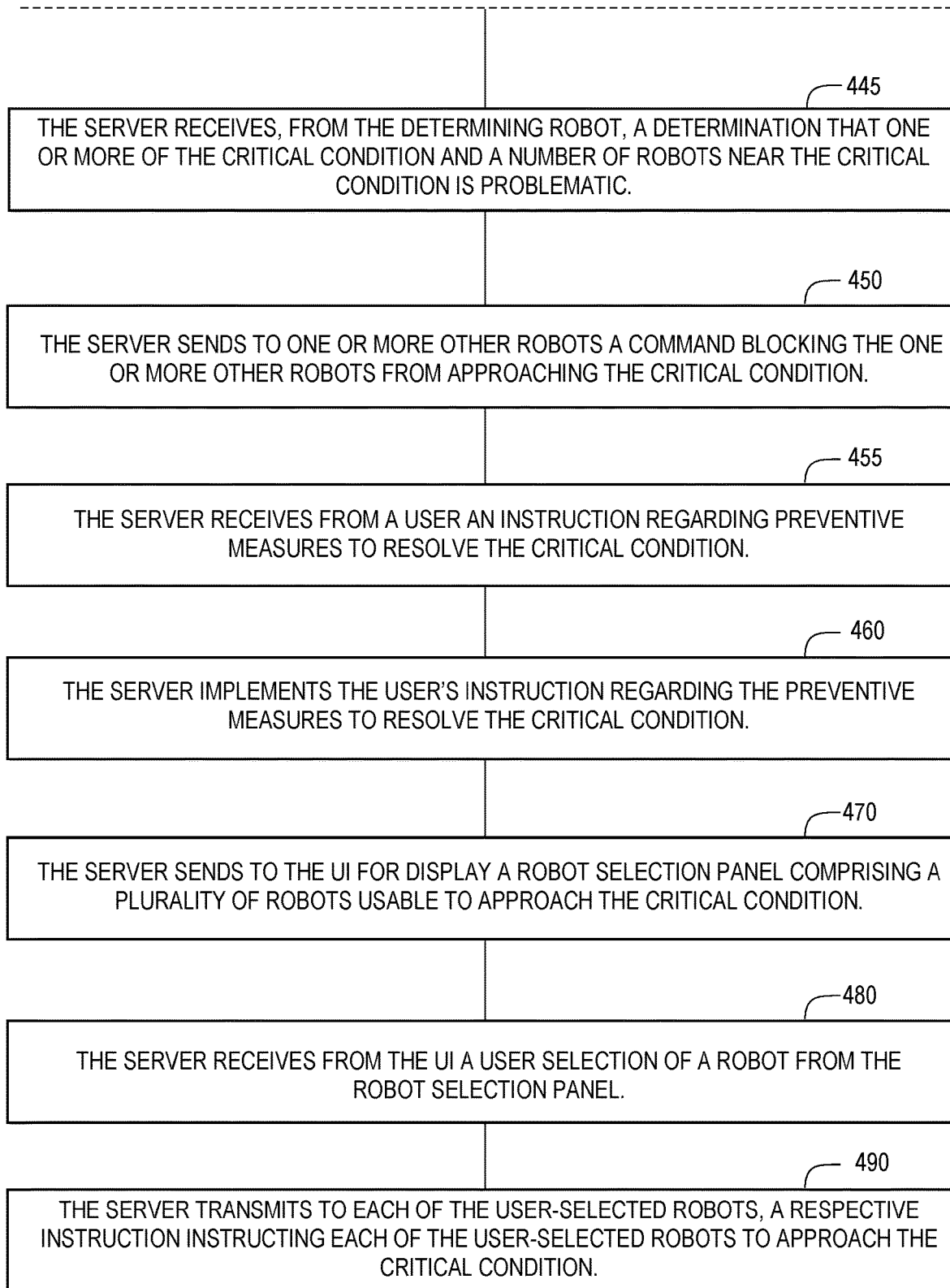

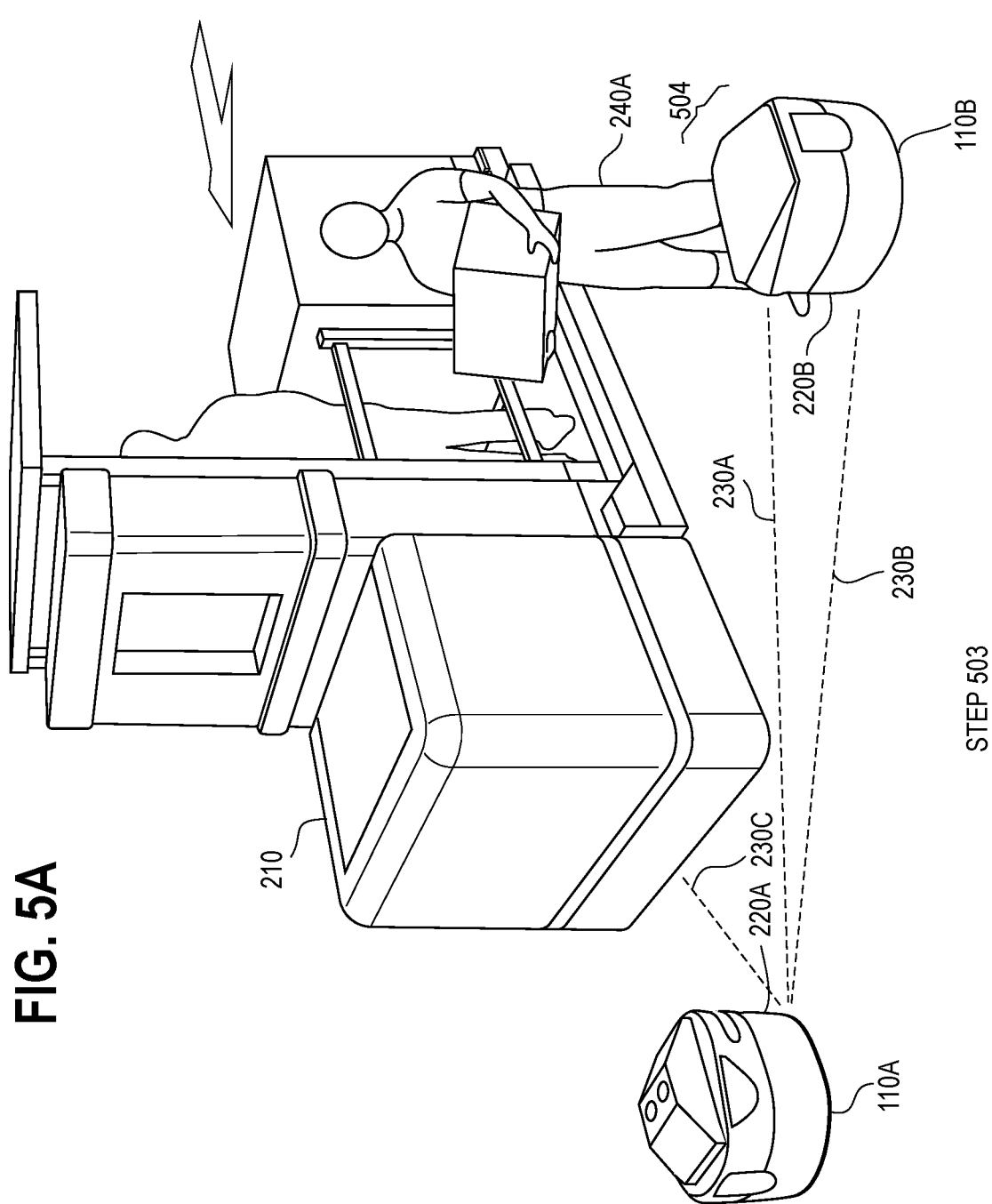

STEP 509

STEP 610

STEP 615

STEP 618

STEP 620

STEP 625

STEP 630

STEP 640

STEP 650

STEP 655

STEP 660

STEP 670

STEP 680

STEP 685

METHOD AND SYSTEM FOR FACILITY MONITORING AND REPORTING TO IMPROVE SAFETY USING ROBOTS

PRIORITY CLAIM

The present application claims the priority benefit of U.S. provisional patent application No. 62/948,440 filed Dec. 16, 2019 and entitled "Method and System for Facility Monitoring and Reporting to Improve Safety Using Robot Swarms on High Alert," the disclosure of which is incorporated herein by reference.

SUMMARY

Embodiments of this invention relate in general to a system and method for facility monitoring and reporting to improve safety using one or more robots. More specifically, embodiments of this invention relate to a system and method for facility monitoring and reporting to improve safety using one or more robots configured to go to be used by one or more of a robot, a self-driving automobile, and another autonomous agent.

For example, according to embodiments of the invention, a robot goes on high alert upon discovery of a critical condition.

Embodiments of the invention relate in general to a system and method for facility monitoring and reporting to improve safety using one or more robots.

A system for facility monitoring and reporting to improve safety using one or more robots, includes: a network, a plurality of autonomous mobile robots operating in a facility, the robots configured to monitor facility operation, the robots further configured to detect a predetermined critical condition, the robots operably connected to the network; a server operably connected to the robots over the network; and a user interface (UI), the UI operably connected to the server, the UI configured to select data received from the server, the UI further configured to display pertinent data to a user, wherein the robots are configured to regularly produce a regular report under normal operating conditions, the report displaying data received from the server, wherein the robots are further configured to produce to the server a critical condition report upon occurrence of the critical condition.

A method for detecting for facility monitoring and reporting to improve safety using one or more robots includes: using a system comprising a network, the system further comprising a plurality of robots operating in a facility, the robots configured to monitor facility operation, the robots further configured to detect a critical condition, wherein the robots are further configured to go into high alert upon detection of the critical condition, the robots operably connected to the network, the system further comprising a server operably connected to the robots over the network, wherein the robots are configured to regularly produce to the server a regular report under normal operating conditions, wherein the robots are further configured to produce to the server a critical condition report upon occurrence of the critical condition, receiving, by the server, from a detecting robot, a critical condition detected by the detecting robot; switching the detecting robot, by the server, from periodic, lower-priority data recording, to high-priority, real-time, continuous data recording and direct uploading; sending the critical condition, by the server, to one or more other robots; and requesting assistance, by the server, for the detecting robot, from the other robots.

A method for detecting for facility monitoring and reporting to improve safety using one or more robots includes: using a system comprising a network, the system further comprising a plurality of robots operating in a facility, the robots operably connected to the network, the robots configured to monitor facility operation, the robots further configured to detect a critical condition, wherein the robots are further configured to go into high alert upon detection of the critical condition, the system further comprising a server operably connected to the robots over the network, wherein the robots are configured to regularly produce to the server a regular report under normal operating conditions, wherein the robots are further configured to produce to the server a critical condition report upon occurrence of the critical condition, receiving, by the server, from a detecting robot, a critical condition detected by the detecting robot; requesting data regarding the critical condition, by the server, from a robot; displaying, by the server, on a user interface (UI) visible to a user, the UI operably connected to the server, the critical condition; generating, by the server, a heat map of the critical condition; generating, by the server, a path usable by the robots around the critical condition; switching the detecting robot, by the server, from periodic, lower-priority data recording, to high-priority, real-time, continuous data recording and direct uploading; sending the critical condition, by the server, to one or more other robots; requesting assistance, by the server, for the detecting robot, from the other robots; receiving, by the server, from the determining robot, a determination that one or more of the critical condition and a number of robots near the critical condition is problematic; sending, by the server, to one or more other robots, a command blocking the one or more other robots from approaching the critical condition; receiving, by the server, from a user, an instruction regarding preventive measures to resolve the critical condition; implementing, by the server, the user's instruction regarding the preventive measures to resolve the critical condition; sending, by the server, to the UI, for display to the user, a robot selection panel comprising a plurality of robots usable to approach the critical condition; receiving, by the server, from the UI, a user selection of a robot from the robot selection panel; and transmitting, by the server, to each of the user-selected robots, a respective instruction instructing each of the user-selected robots to approach the critical condition.

DESCRIPTION OF THE DRAWINGS

The accompanying drawings provide visual representations which will be used to more fully describe various representative embodiments and can be used by those skilled in the art to better understand the representative embodiments disclosed herein and their inherent advantages. In these drawings, like reference numerals identify corresponding elements.

FIGS. 1A-1C are a set of three drawings of a system for facility monitoring and reporting to improve safety using one or more robots.

FIGS. 2A-2F are a set of six drawings of a system for facility monitoring and reporting to improve safety using one or more robots.

FIG. 4 is a flow chart illustrating a method for detecting a critical condition by an autonomous mobile robot using a system for facility monitoring and reporting to improve safety using one or more robots.

FIGS. 5A-5F are a set of diagrams illustrating a method for detecting a critical condition by an autonomous mobile robot using a system for facility monitoring and reporting to improve safety using one or more robots.

DETAILED DESCRIPTION

Figure 1A:
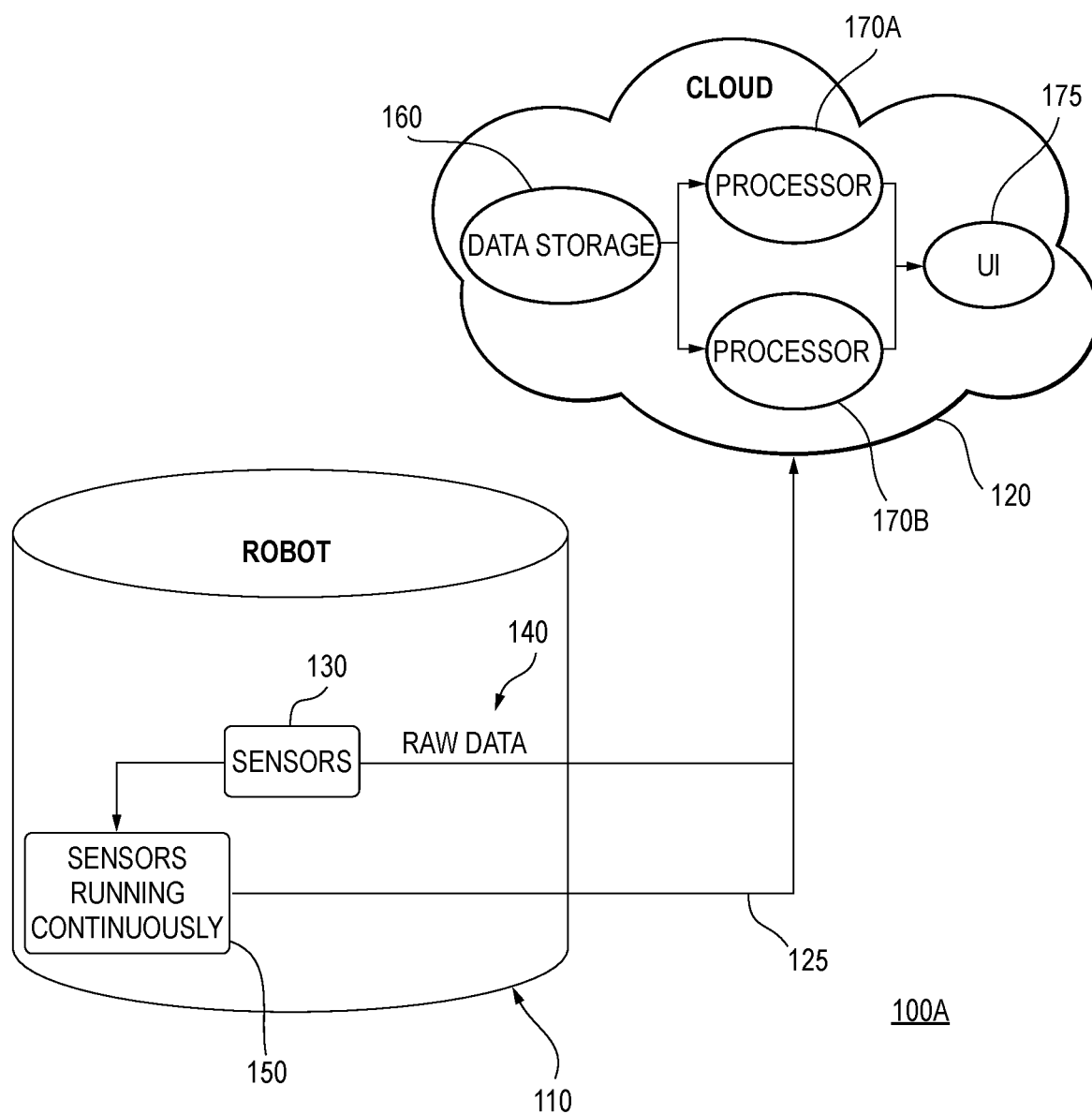

While the present invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the following description and in the several figures of the drawings, like reference numerals are used to describe the same, similar or corresponding parts in the several views of the drawings.

Embodiments of the invention relate in general to a system and method for facility monitoring and reporting to improve safety using one or more robots. For example, the facility comprises a warehouse.

According to embodiments of the invention, robots can be used to improve safety of the facility by tracking speed of one or more vehicles moving within the facility. For example, the vehicles comprise one or more of forklifts, golf carts, autonomous guided vehicles (AGVs), autonomous mobile robots (AMRs), and other vehicles. According to yet other embodiments of the invention, robots can detect a velocity of objects in the vicinity using sensor data comprising one or more of a laser scan, a camera point cloud, radio frequency identification (RFID) data, inertial measurement unit (IMU) data, and other data. Robots can produce information on safety and security incidents such as, for example, near misses and a number of vehicles that exceed the speed limit. The robots can produce such reports with any desired frequency, for example with a frequency that is one or more of daily, weekly, and monthly.

For example, the robot further comprises a critical condition detector configured to monitor for occurrence of a critical condition. For example, the critical condition is one or more of predetermined and defined by a user. For example, the critical condition comprises one or more of a critical condition comprises ed as one or more of a flood; a near miss of two or more entities; a vehicle exceeding a speed limit; traffic congestion; a spill; a blocked emergency exit; a fire; unexpected sprinkler activation, water on the floor from a roof leak; a heavy machinery accident; a robotic detection of one or more of a movement out of permissible bounds, a collision, or a significantly damaged surface over which the robot is travelling; a robot receiving an external trigger from the server to record data in a specific area of interest; a robot receiving an external trigger from the server to record data regarding a specific object of interest; exceeding one or more of a predetermined numerical threshold and a predetermined proximity threshold for a number of humans, robots, and objects of a specified category; passage of a predetermined time period from a beginning of a task; and absence of an object from a location where the system expects its presence.

The robot further comprises an alarm module configured to take action upon receipt of a trigger notifying the alarm module that the critical condition has occurred. If the critical condition detector detects a critical condition, the robot triggers the alarm module. Upon receiving the trigger, the alarm module performs one or more of sending a stop command to the server stream, sending an error code to the robots, and streaming to the cloud the data describing the critical condition. The stop command orders the server to stop the critical condition. The error code corresponds to the critical condition.

According to other embodiments of the invention, robots can be used to sense one or more of a region of a facility and an entire facility to improve safety of the facility by detecting near misses when two or more entities in the facility come closer to each other than a predetermined permissible distance. For example, the entities comprise one or more of a human, a vehicle, a forklift, a golf cart, an autonomous guided vehicle, a robot, and a rack.

For example, the permissible distance comprises one foot. For example, the permissible distance comprises one inch. For example, the robot is configured to send an alert upon occurrence of a near miss. For example, the alert comprises a recording of the near miss. For example, the recording comprises a video recording. For example, the robot sends the alert including the video recording to a manager of the facility.

For example, according to yet further embodiments of the invention, if a robot comes too close to an obstacle, it triggers a nearby camera to start monitoring the area surrounding the robot. According to still other embodiments of the invention, the system also responds by sending a code to the offending robot over a communication network, the code being configured to trigger other robots to respond to the near miss. For example, the network comprises one or more of Bluetooth, WiFi, the cloud, and another network. The responding robot can collect additional data regarding precipitating factors behind the near miss that would not otherwise be collected. For example, the responding robot starts recording data using its sensor. According to still other embodiments of the invention, the responding robot sends a code over the network to at least one other robot in the vicinity, the code being configured to trigger other robots to respond to the near miss.

According to other embodiments of the invention, robots continuously detect and monitor a number of one or more of humans, forklifts, golf carts, autonomous guided vehicles, autonomous mobile robots and other moving obstacles in the facility. This information from multiple robots is sent to the system over the network. For example, the system uses the information to generate statistics on facility workflow over time. For example, the system uses the information to generate a lane planning algorithm providing a more optimal route for the robots.

According to yet further embodiments of the invention, robots can be used to sense one or more of a region of a facility and an entire facility to improve safety of the facility by doing one or more of detecting congestion and reporting the congestion. Congestion may be loosely defined as a condition in which more than an optimum number of moving entities are positioned within a given area of the facility. For example, congestion may be defined as occurring whenever more than six moving entities, either humans or vehicles, occupy an area of twenty square feet. For example, congestion may be defined as occurring whenever more than three moving entities, either humans or moving vehicles, occupy an area of one square meter.

For example, the robot is configured to send an alert upon occurrence of congestion exceeding a specified congestion limit. For example, the robot sends the congestion alert to a manager of the facility.

According to still other embodiments of the invention, robots can be used to sense one or more of a region of a facility and an entire facility to improve safety of the facility by checking one or more points of interest. For example, the robots check the one or more points of interest to check for one or more or presence of a desired condition and absence of a non-desired condition. For example, the non-desired condition comprises a critical condition.

For example, in the event that the point of interest comprises a fire extinguisher, a desired condition is functionality of the fire extinguisher and a non-desired condition is non-functionality of the fire extinguisher. For example, the robot may determine that the fire extinguisher is non-functional it is one or more of broken and missing an adequate level of fire extinguishing fluid in its canister. In the case of the fire extinguisher, according to further embodiments of the invention, the robot is configured to replace the non-functional fire extinguisher with a functional replacement fire extinguisher.

The system is configured to conduct automated building safety audits. The safety audit investigates a status of one or more of an emergency exit, a fire extinguisher condition, a fire extinguisher placement, access to an electrical panel, status of a rack protector, status of a guard rail, and another condition of interest. The system is further configured to receive real-time alerts in advance of mandatory inspections by identifying one or more of a blocked emergency exit, a fire extinguisher condition, a fire extinguisher placement, access to an electrical panel, a damaged rack protector, a damaged guard rail, and another condition of interest.

If a robot is passing in the vicinity of one or more of an emergency exit and a fire extinguisher that has not been checked within a user-specified amount of time, the passing robot can be assigned to monitor the one or more of an emergency exit and a fire extinguisher even though they are not exactly on the route.

For example, in the event that the point of interest comprises an emergency exit, a desired condition is the emergency exit being closed and a non-desired condition is the emergency exit being open. In the case of the emergency exit, according to further embodiments of the invention, the robot is configured to close an open emergency exit.

According to yet other embodiments of the invention, robots can be used to sense one or more of a region of a facility and an entire facility to monitoring work areas. For example, the robots monitor the facility work areas using facility safety standards, for example, "Five Steps" (5S).

The robot detects whether one or more of a box and a pallet is within a designated area to ensure facility compliance with 5S regulations.

A feature offered by embodiments of the invention is an instant hazard avoidance zone according to which, from anywhere on any device, the system can instantly isolate robots away from an emergency incident such as one or more of an unexpected sprinkler activation, water on the floor from a roof leak, and a heavy machinery accident.

Another feature offered by embodiments of the invention is proactively re-slotting robot shifts ahead of one or more of increased customer demands and seasonal shifts in work patterns. The system synchronizes storage locations with one or more of movement of goods and facility traffic conditions. Onboard robotic sensors capture areas of heavy congestion. Additionally, an automatic RFID tag onboard the robot does one or more of track and monitor stock-keeping unit (SKU) velocity. The system then uploads the data using the network to optimize facility space utilization.

One application of the system and method for facility monitoring and reporting to improve safety using one or more robots is marking the map of the facility with one or more areas dictating one or more of a minimum speed limit and a maximum speed limit for a vehicle. For example, one or more of the minimum speed limit and the maximum speed limit may be the same for all vehicles. Alternatively, or additionally, one or more of the minimum speed limit and the maximum speed limit applies to a specified vehicle type only. According to further embodiments of the invention, the robot is configured to send an alert upon detecting a vehicle of the specified type exceeding the designated speed limit. For example, the robot sends the alert to a manager of the facility.

Another application of the system and method for facility monitoring and reporting to improve safety using one or more robots is creating a heat map viewable by a user, the heat map visually showing a congestion level in the facility. Alternatively, or additionally, the server generates a heat map of the critical condition. For example, the heat map shows the congestion level throughout the facility. For example, the heat map shows the congestion level throughout the facility for one or more of a vehicle and a human. For example, the heat map shows the congestion level in the facility for a designated type of vehicle. For example, the vehicle type comprises one or more of forklift, golf cart, autonomous guided vehicle, autonomous mobile robot, and another vehicle type. For example, after generating the heat map, the server sends the heat map to the UI for display.

The present invention concerns multiple robots performing regular monitoring of their environment, when a critical condition is noticed. In one embodiment, the critical condition is noticed by a user who has been monitoring the collective data of the robots. In another embodiment, the critical condition is noticed by a robot, which notifies its robot colleagues of the condition, as well as notifying a server of the condition. Once the critical condition has been noticed and reported, a number of different responses can result according to embodiments of the invention. One such response involves the system placing the robots in response to the condition. The present invention includes a UI for performing one or more of monitoring the robots and managing the robots.

According to embodiments of the invention, the robot can be programmed to detect one or more of a range of critical conditions. One critical condition known as "IMU/Odom" (Inertial Measurement Unit/Odometry sensors) occurs if a robot detects one or more of a movement out of permissible bounds, a collision, or a significantly damaged surface over which the robot is travelling.

A second critical condition known as "external triggers to record data in a specific area" comprises a notification received by the robot indicating that the area in which the robot is located is of interest. For example, the notification indicates that the travel area is of interest to one or more of a user and a second robot that the system instructs to assist in responding to the critical condition. For example, the system may instruct the second robot to assist in responding to the critical condition if the first robot is in a position where a collision may occur. For example, the system may instruct the second robot to assist in responding to the critical condition if the system recognizes an object that recently arrived in the area.

The system triggers this critical condition when the robot's internal localization data indicates that the robot is within the area of interest.

A third critical condition known as "human/forklift/conveyer detection (triggered in a 1 m radius vicinity)" is similar to the second critical condition, except that now a particular object of interest is being detected, rather than a particular area. The system triggers this critical condition when the robot's sensor detects the object of interest, and the internal localization data indicates that the robot is within a specified distance of the object. The robot sends trigger codes over the network configured to instruct other nearby robots to pause their current activity and prioritize the triggered task.

A fourth critical condition known as "too many humans/robots/forklifts/carts" is triggered by the system when one or more of a predetermined numerical threshold and a predetermined proximity threshold is reached. The robots send this information immediately to the cloud. The system then does one or more of instruct other robots in the vicinity to record sensor data in the specific area and instruct idle robots to monitor the area of interest.

A fifth critical condition known as "keep track of any nav times and notify if all of sudden tasks took too long" is triggered by the system when a predetermined time period passes from the beginning of a task.

A sixth critical condition known as "shelf/marker missing" is triggered by the system when an object that the system expects will be present is instead missing.

A user utilizes a user interface (UI) to manage the robots. The robots generate data that the robots send to the server. The robots send the data to the server one or more of periodically and continuously. For example, the robots send the data to the server periodically during normal operation. For example, the robots send the data continuously upon detection of a critical condition. The system uses the received data to generate a representation of the system displayable on the UI. For example, the displayed data comprises one or more of the regular report and the critical condition report. For example, the displayed data comprises the critical condition.

For example, the UI comprises a first map displaying a location of a robot and a confidence associated with the detected critical condition. The confidence comprises a cumulative confidence that the robots have in an accuracy of the identified critical condition. The first map enables a user to determine a probability that the critical condition has occurred.

For example, the UI comprises a second map displaying a location of a detected critical condition. The second map further comprises a relative position of at least one robot. The second map enables the user to do one or more of monitor and manage progress of the robots in responding to the critical condition.

For example, the UI further comprises a timeline comprising a view of the data over time. For example, the timeline comprises one or more of a photograph, an audio recording, and a video recording. For example, the timeline presents the data in chronological order. The timeline enables a user to investigate possible causes of a detected critical condition.

The UI comprises a configuration button configured upon selection to open a settings page displaying settings options for the user. The settings comprises one or more of notifications settings, filtering settings, and visualization settings.

Notifications settings enable the user to specify details of system notifications provided to the user. For example, the notifications settings comprises one or more of 1) a means of notification (for example, text messages, electronic mail, telephone call, and the like), 2) a type of notification (for example, Robot Operating System ("RViz"), small UI messages ("toasts") at the bottom of the UI screen, and the like), and 3) a subject of the notifications (for example, map augmentations, robot localization, and the like).

Filtering settings enable the user to only receive data of interest to the user and to filter out other data. For example, the filtering settings comprise one or more of type of event, time of event, and priority of event. Filtering settings can be implemented using one or more of a heat map configured to overlay data on the map and a scrubbing functionality that allows the user to scroll through the timeline while watching a visualization of the data.

Visualization settings enable the user to choose a kind of content to display in the UI. Examples of such content include new annotations and nav mesh. For example, the new annotation comprises one or more of a forklift and a package. For example, the nav mesh comprises one or more of an obstruction and a slippage. Choosing one or more of these content types causes the chosen content to appear on the UI, in one or more of the first map, the second map, and the timeline. These settings provide the user with a fuller picture of the area of interest.

The visualization settings also allow the user to select one or more detectors. Each detector may be configured to identify one or more critical conditions. After selecting one or more detectors, the user can use one or more of the first map, the second map, the timeline, and filtering settings to do one or more of analyze critical conditions and review underlying sensor data.

The first map allows the user to create annotations that specify safety rules. For example, the safety rule comprises a requirement that an area must be kept free, for example, the space in front of an emergency exit. For example, the safety rule comprises a maximum speed limit for an area. The UI further comprises a visualization usable to highlight a critical condition detected by the robots.

Figure 1B:
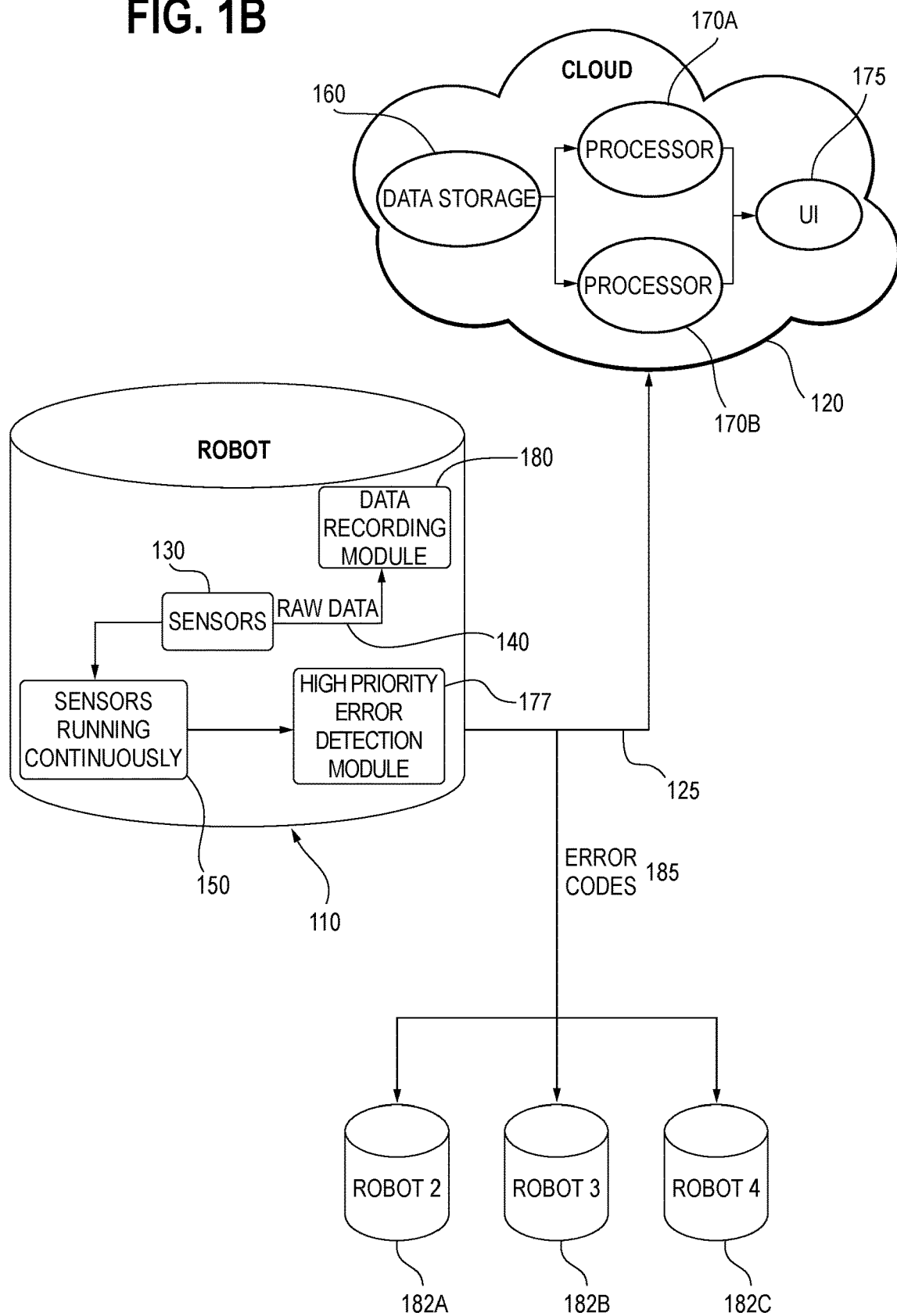

FIGS. 1A-1C are a set of three drawings of a system for facility monitoring and reporting to improve safety using one or more robots.

FIG. 1A is a drawing of a system 100A for facility monitoring and reporting to improve safety using one or more robots 110. The system 100 further comprises a cloud 120 that is operably connected over a network connection 125 to the robot 110. The robot 110 is configured to switch to high alert upon detection by the system 100 of certain conditions.

For example, the robot 110 comprises one or more sensors 130. For example, the sensor 130 comprises one or more of a depth camera, a two-dimensional (2D) light detection and ranging (LIDAR) sensor, and another sensor. While the robot 110 is navigating around the facility (not shown), the sensors 130 are generating data 140. For example, the data 140 comprises raw data. For example, the data 140 comprises one or more of video data, audio data, location data, point cloud data, and other data. Preferably, but not necessarily, the sensors 130 are running continuously 150. The sensors 130 are continuously transmitting the data 140 to the cloud 120 via the network connection 125.

For example, the robot 110 uses a server stream module (not shown) to upload the data 140 to the cloud 120. Although not complete or continuous, the periodic data 140 streaming from the robot 110, optionally combined with periodic data 140 streaming from other robots (not shown), is generally sufficient to provide the system 100 with a multi-dimensional view of the facility (not shown). The streamed data, presented to a user through the UI, enables the user to detect and investigate problems.

The cloud 120 comprises data storage 160, the data storage 160 configured to store the data 140 received over the network connection 125 from the robot 110. The data storage 160 is operably connected to one or more processors 170A and 170B. For example, the processors 170A and 170B are configured to generate metrics using the data 140 received from the robot 110. For example, the metrics comprise one or more of a statistical algorithm and a machine learning algorithm. For example, the metrics comprise one or more of an average, a median, a mode, a variance, a linear regression, a k mean clustering, and the like.

The processors 170A and 170B are operably connected to a user interface (UI) 175. Output from the processors 170A and 170B can be visualized for a user in the UI. For example, one or more of a map, a critical condition and another feature of interest can be visualized for the user in the UI.

FIG. 1B is a drawing of a system 100B for facility monitoring and reporting to improve safety using one or more robots 110. The system 100 again further comprises the cloud 120 that is operably connected over the network connection 125 to the robot 110. For example, the cloud 120 again comprises the cloud 120. The robot 110 is again configured to switch to high alert upon detection by the system 100 of certain conditions.

For example, the robot 110 again comprises one or more sensors 130. For example, the sensor 130 again comprises one or more of a depth camera, a two-dimensional (2D) light detection and ranging (LIDAR) sensor, and another sensor. While the robot 110 is navigating around the facility (not shown), the sensors 130 again are generating data 140. For example, the data 140 comprises raw data. For example, the data 140 again comprises one or more of video data, audio data, location data, point cloud data, and other data. Preferably, but not necessarily, the sensors 130 are again running continuously 150.

The robot 110 further comprises a high priority error detection module 177 configured to detect errors having high priority in the data 140. The high priority is determined based on one or more of user input and a predetermined priority. The sensors 150 are operably connected to the high priority error detection module 177. The sensors 130 are again continuously transmitting the data 140 to the cloud 120 via the network connection 125.

For example, the robot 110 again uses a server stream module (not shown) to upload the data 140 to the cloud 120. Although not complete or continuous, the periodic data 140 streaming from the robot 110, optionally combined with periodic data 140 streaming from other robots (not shown), is generally sufficient to provide the system 100 with a multi-dimensional view of the facility (not shown). The streamed data, presented to a user (not shown) through the UI 175, enables the user (not shown) to detect and investigate problems. The robot 110 further comprises a data recording module 180 configured to record the data 140.

The cloud 120 again comprises data storage 160, the data storage 160 again configured to store the data 140 received over the network connection 125 from the robot 110. The data storage 160 is again operably connected to one or more processors 170A and 170B. For example, the processors 170A and 170B are configured to generate metrics using the data 140 received from the robot 110. For example, the metrics comprise one or more of a statistical algorithm and a machine learning algorithm. For example, the metrics comprise one or more of an average, a median, a mode, a variance, a linear regression, a k mean clustering, and the like. The processors 170A and 170B are again operably connected to a user interface (UI) 175 configured to visualize for the user (not shown) one or more of a map and a critical condition and another feature of interest.

The error detection module 177 is operably connected to one or more other robots 182A, 182B, and 182C. As depicted, the error detection module 177 is connected to three other robots 182A, 182B, and 182C. If the high priority error detection module 177 detects one or more errors in the data 140 having the high priority based on the one or more of user input and a predetermined priority, then the error detection module 177 transmits error codes 185 describing the detected high priority error in the data 140 to the one or more other robots 182A, 182B, 182C.

FIG. 1C is a drawing of a steady-state system 100C for facility monitoring and reporting to improve safety using one or more robots 110. The system 100 again further comprises the cloud 120 that is operably connected over the network connection 125 to the robot 110. For example, the cloud 120 again comprises the cloud 120. The robot 110 is again configured to switch to high alert upon detection by the system 100 of certain conditions.

For example, the robot 110 receives data 140. For example, the data 140 again comprises one or more of video data, audio data, location data, point cloud data, and other data. For example, the data 140 comprises recorded data. The robot 110 further comprises a data analyzer 188 configured to analyze the data. The data analyzer 188 analyzes the data 140 while the robot 110 is charging.

The robot 110 transmits the data 140 to the data analyzer 188. After analyzing the data 140, the data analyzer 188 outputs metrics 190. For example, the metrics comprise one or more of a statistical algorithm and a machine learning algorithm. For example, the metrics comprise one or more of an average, a median, a mode, a variance, a linear regression, a k mean clustering, and the like. For example, the data analyzer 188 comprises one or more long-running analytics processes. The robot 110 transmits the metrics 190 to the cloud 120 via the network connection 125. For example, the robot 110 uploads the metrics 190 to the cloud 120 via the network connection 125.

The robot 110 further comprises a high priority error detection module 177 configured to detect errors having high priority in the data 140. The high priority is determined based on one or more of user input and a predetermined priority. The sensors 150 are operably connected to the high priority error detection module 177. The sensors 130 are again continuously transmitting the data 140 to the cloud 120 via the network connection 125.

For example, the robot 110 again uses a server stream module (not shown) to upload the data 140 to the cloud 120. The streamed data, presented to a user (not shown) through the UI (not shown), enables the user (not shown) to detect and investigate problems. The robot 110 further comprises a data recording module 180 configured to record the data 140.

The cloud 120 again comprises data storage 160, the data storage 160 again configured to store the data 140 received over the network connection 125 from the robot 110. For example, the data storage 160 comprises multi-tier cloud-based data storage 160. The data storage 160 is again operably connected to an processor 170. For example, the processor 170 again are configured to generate metrics using the data 140 received from the robot 110.

FIGS. 2A-2F are a set of six drawings of a system for facility monitoring and reporting to improve safety using one or more robots.

FIG. 2A is a drawing of a system 200A for facility monitoring and reporting to improve safety comprising one or more robots 110A and 110B. As depicted, the system comprises a first robot 110A and a second robot 110B. The forklift 210 is moving in a direction indicated by velocity arrow 215. The first robot 110A comprises a first sensor 220A. As depicted, the first sensor 220A comprises a first sensor 220A. The first robot 110A detects the forklift 210 using the first sensor 220A. The first sensor 220A detects the forklift 210 using first robot detection beams 230A. The second robot comprises a second sensor 220B. As depicted, the second sensor 220B comprises a second sensor 220B. The second robot 110B detects the forklift 210 using the second sensor 220B. The second sensor 220B detects the forklift using second robot detection beams 230B. The system 200A further comprises a human worker 240.

Figure 2B:
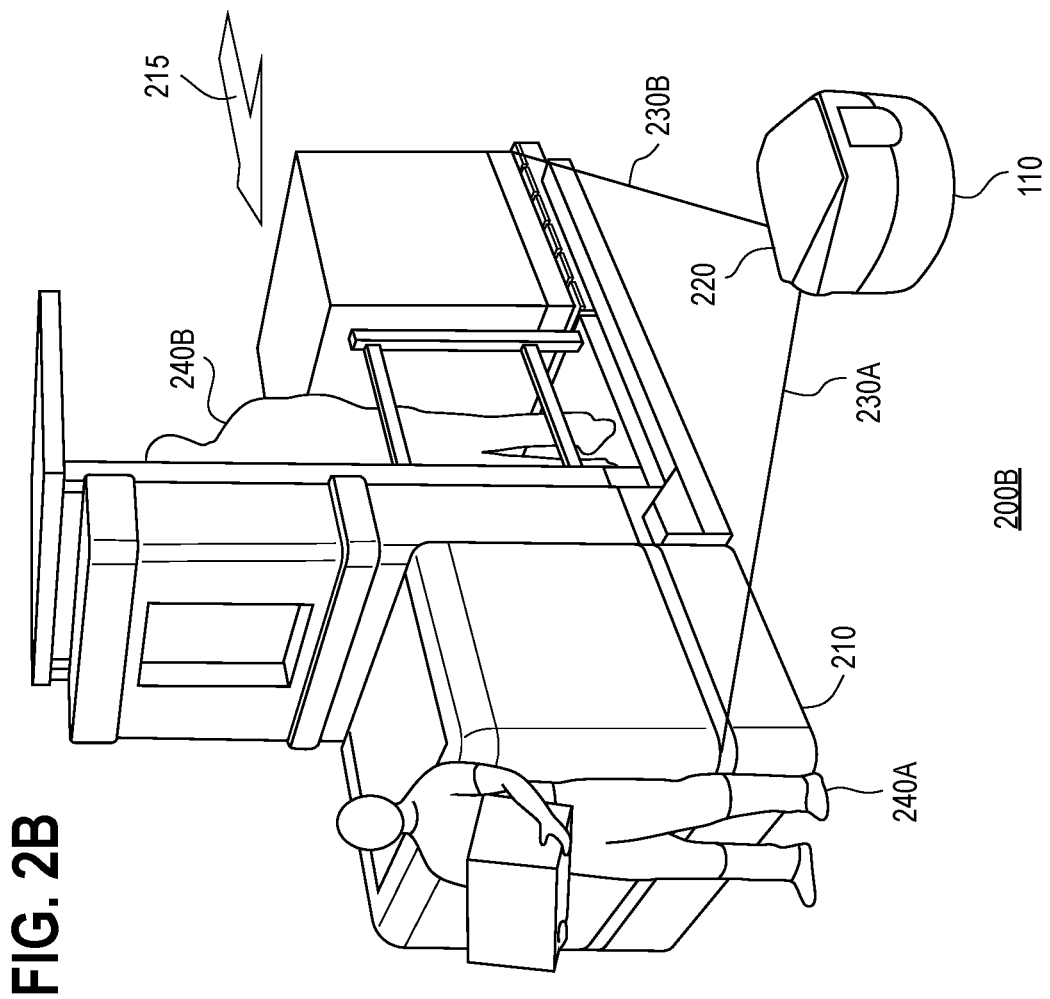

FIG. 2B is a drawing of a system 200B for facility monitoring and reporting to improve safety comprising one or more robots 110, showing a robot 110 detecting both a first human 240A and a moving forklift 210. The robot 110 again comprises the sensor 220. As depicted, the system 200B comprises one robot 110. The system 200B comprises the forklift 210. The system 200B further comprises a first human worker 240A and a second human worker 240B. The forklift 210 is moving in a direction indicated by the velocity arrow 215. The robot 110 detects the first human 240A using the sensor 220. The robot 110 also detects the forklift 210 using the sensor 220. The sensor 220 detects the first human 240A using a first robot detection beam 230A. The sensor 220 detects the forklift 210 using a second robot detection beam 230B. The sensor 220 detects a near miss of the moving forklift 210 and the first human worker 240A. The near miss activates a critical condition for the robots 110, to which the robots 110 respond by going into high alert.

Figure 2C:
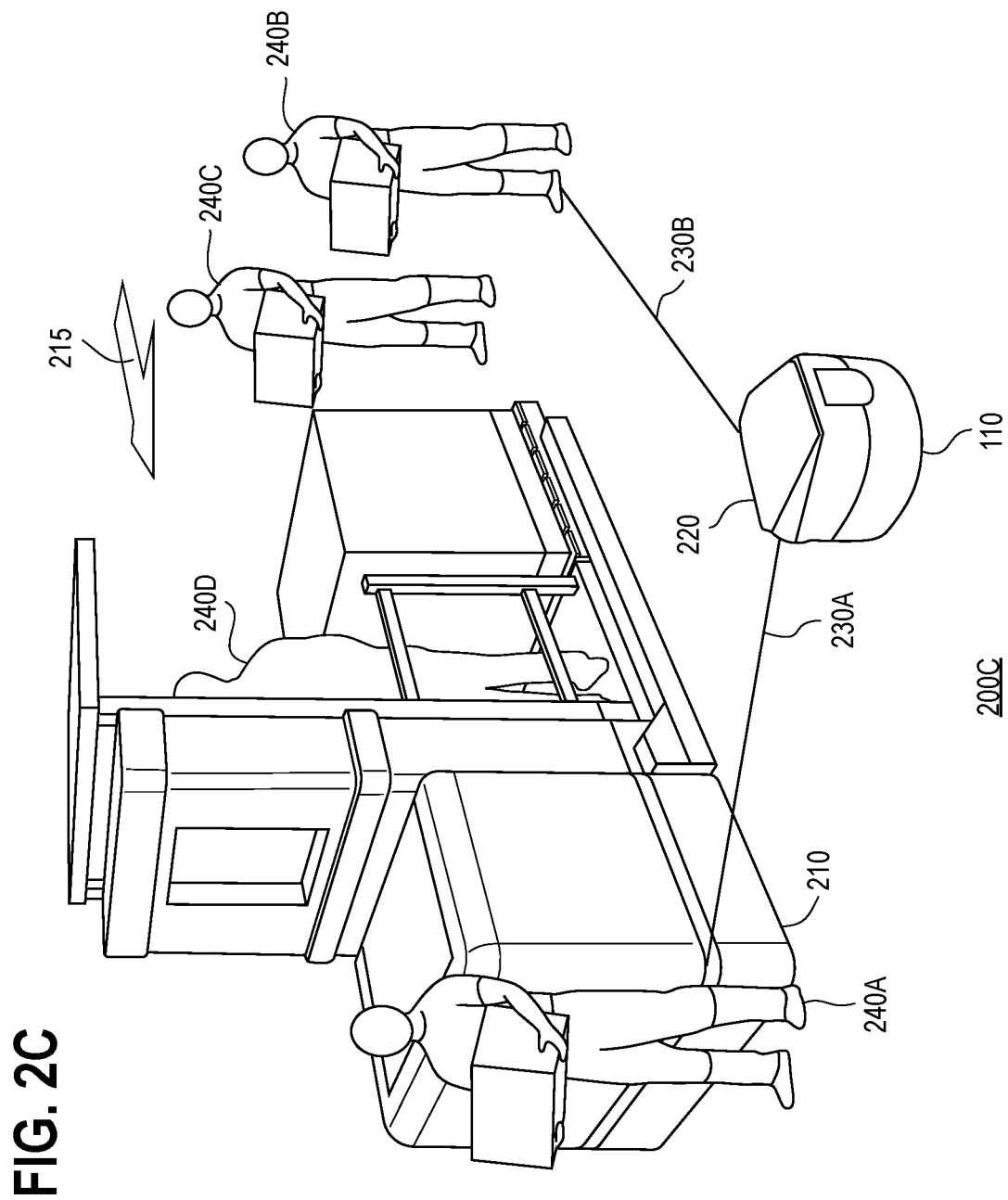

FIG. 2C is a drawing of a system 200C for facility monitoring and reporting to improve safety comprising one or more robots 110. The robot 110 again comprises the sensor 220. As depicted, the system 200C comprises one robot 110. The system again comprises the forklift 210. The system 200C further comprises human workers 240A-240D. The forklift 210 is moving in a direction indicated by the velocity arrow 215. The robot 110 detects the first human 240A using the sensor 220. The robot 110 also detects the second human 240B using the sensor. The sensor 220 detects the first human 240A using a first robot detection beam 230A. The sensor 220 detects the second human 240B using a second robot detection beam 230B. The sensor 220 detects a near miss of the moving forklift 210 and the first human worker 240A. The near miss activates a critical condition for the robots 110, to which the robots 110 respond by going into high alert.

Figure 2D:
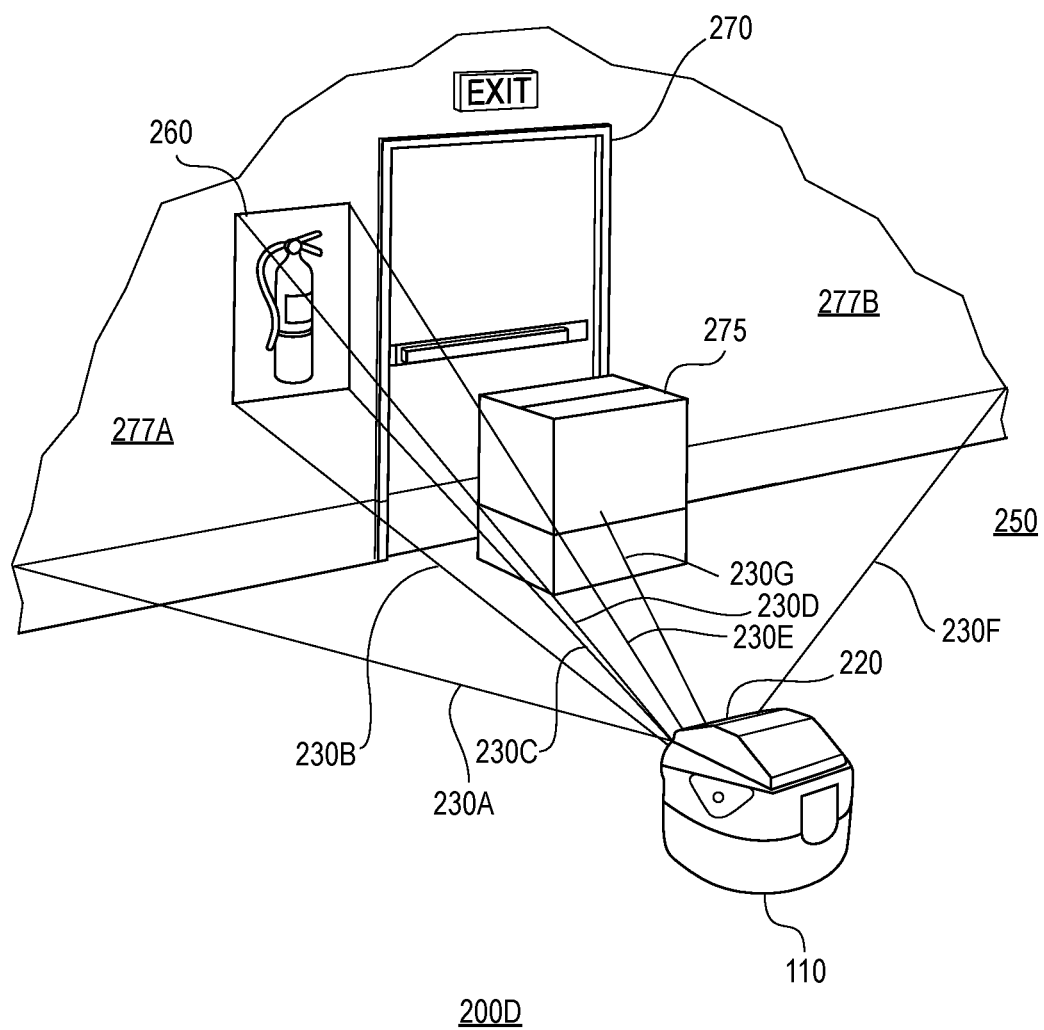

FIG. 2D is a drawing of a system 200D for facility monitoring and reporting to improve safety comprising one or more robots 110, showing the robot 110 checking safety of a facility 250. As depicted, the system 200D comprises one robot 110. The facility 250 comprises a fire extinguisher 260 and an emergency exit 270. As depicted, the emergency exit 270 comprises a fire door 270. The robot 110 again comprises the sensor 220. The robot 110 detects the fire extinguisher 260 using the sensor 220. The robot 110 also detects the emergency exit 270 using the sensor. The sensor 220 detects a left side 277A of the emergency exit 270 using a first robot detection beam 230A. The sensor 220 detects the fire extinguisher 260 using one or more of a second robot detection beam 230B, a third robot detection beam 230C, a fourth robot detection beam 230D, and a fifth robot detection beam 230E. The sensor 220 detects a right side 277B of the emergency exit 270 using a sixth robot detection beam 230F. Based on the results of one or more of the first robot detection beam 230A and the sixth robot detection beam 230F, the robot 110, in communication with the server (not shown), determines a possibility that a critical condition exists involving blockage of the emergency exit 270. The robot 110 receives from the server (not shown) instructions to further investigate the possible blockage of the emergency exit 270. The robot 110 therefore detects the emergency exit 270 using a seventh robot detection beam 230G. The seventh robot detection beam 230G detects a box 275 blocking the emergency exit 270. The blocked emergency exit 270 activates a critical condition for the robots 110, to which the robots 110 respond by going into high alert.

Figure 2E:
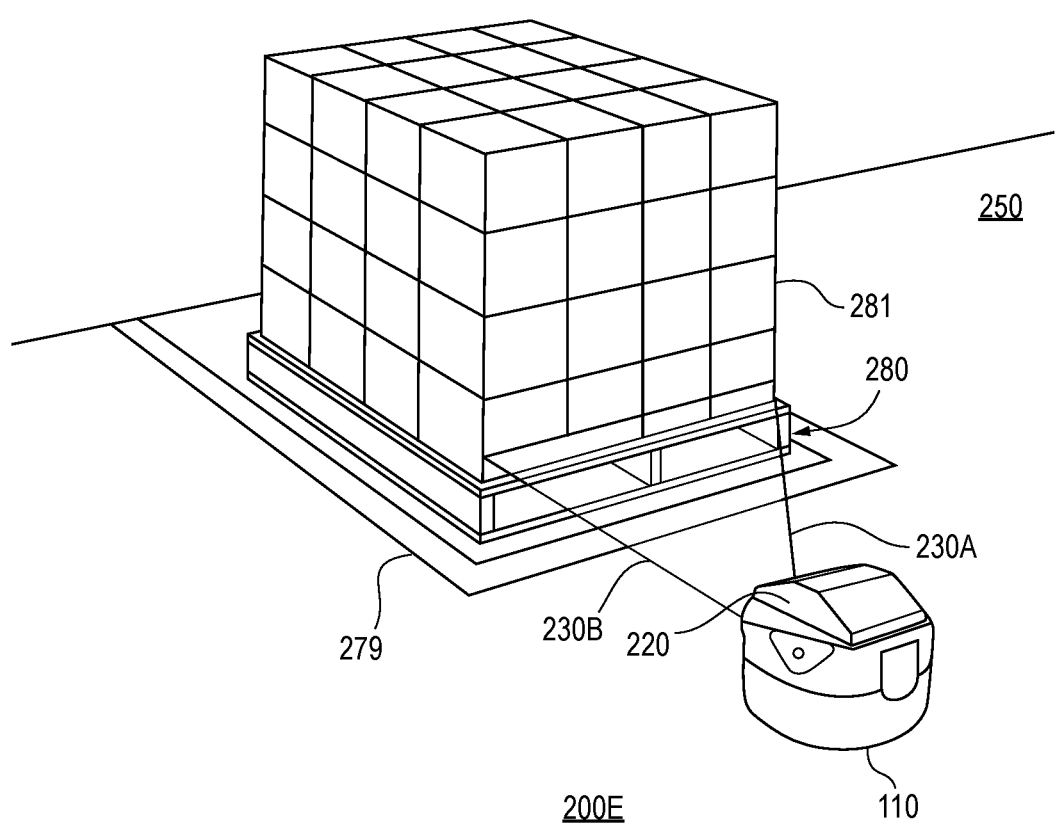

FIG. 2E is a drawing of a system 200E for facility monitoring and reporting to improve safety comprising one or more robots 110, showing the robot 110 checking safety of a facility 250. The facility 250 comprises a designated pallet location 279. As depicted, the designated pallet location 279 comprises a pallet 280. As depicted, the pallet 280 comprises a payload 281. As depicted, the payload 281 comprises a box 281. The robot 110 again comprises the sensor 220. The robot 110 detects the pallet 280 using the sensor 220. The robot 110 also detects the payload 281 using the sensor. The sensor 220 detects the pallet 280 using a first robot detection beam 230A. The sensor 220 detects the payload 281 using a second robot detection beam 230B. Based on the results of one or more of the first robot detection beam 230A and the sixth robot detection beam 230F, the robot 110, in communication with the server (not shown), determines that one or more of the pallet 280 and the payload 281 are properly located entirely within the designated pallet location 279. As depicted, both the pallet 280 and the payload 281 are properly located entirely within the designated pallet location 279. The proper location of the one or more of the pallet 280 and the payload 280 therefore does not activate a critical condition for the robots 110.

The robot 110 also checks one or more of an orientation of the pallet 280 and a size of the payload 281 to ensure that no overhanging objects outside the pallet boundary violate 5S regulations, thereby creating a critical condition for the robot 110, to which the robot 110 responds by going into high alert.

Figure 2F:
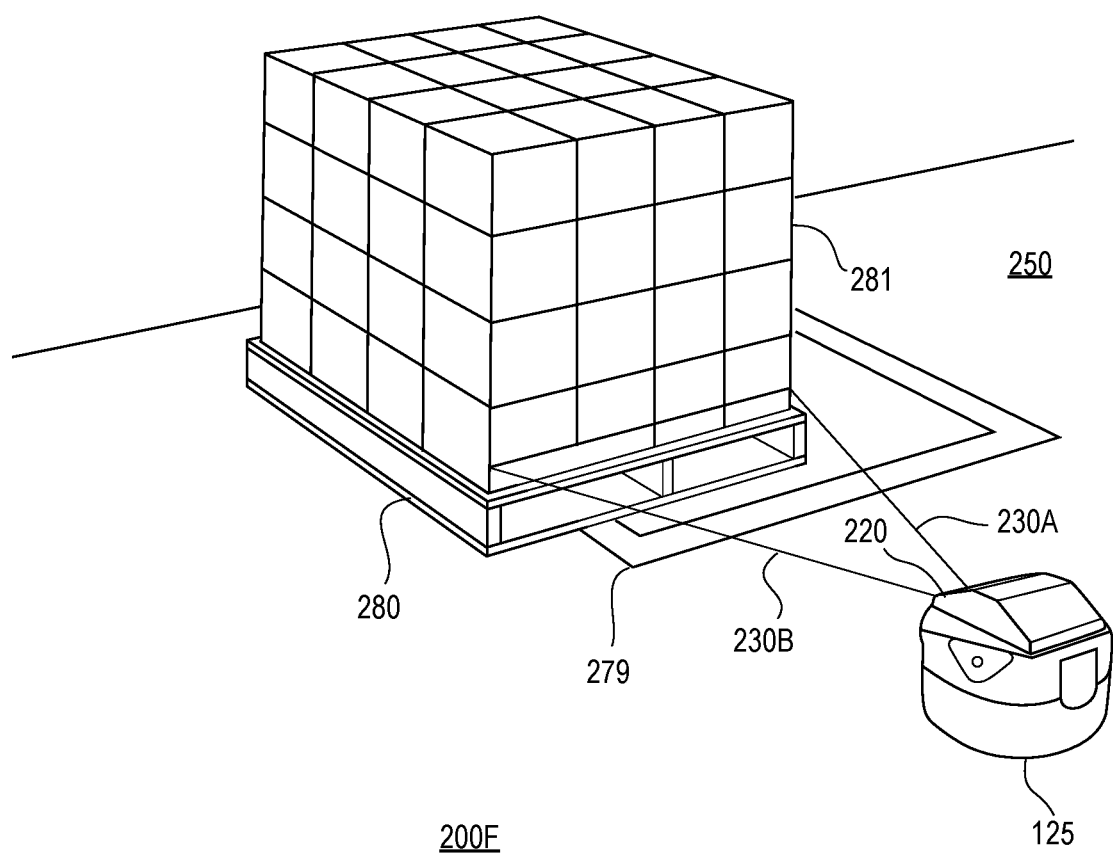

FIG. 2F is a drawing of a system 200F for facility monitoring and reporting to improve safety comprising one or more robots 110, showing the robot 110 checking safety of a facility 250. The facility 250 comprises a designated pallet location 279. As depicted, the designated pallet location 279 comprises a pallet 280. As depicted, the pallet 280 comprises a payload 281. As depicted, the payload 281 comprises a box 281. The robot 110 again comprises the sensor 220. The robot 110 detects the pallet 280 using the sensor 220. The robot 110 also detects the payload 281 using the sensor. The sensor 220 detects the pallet 280 using a first robot detection beam 230A. The sensor 220 detects the payload 281 using a second robot detection beam 230B. Based on the results of one or more of the first robot detection beam 230A and the sixth robot detection beam 230F, the robot 110, in communication with the server (not shown), determines that one or more of the pallet 280 and the payload 281 are not properly located entirely within the designated pallet location 279. As depicted, both the pallet 280 and the payload 281 are not properly located entirely within the designated pallet location 279. The improper location of the one or more of the pallet 280 and the payload 280 therefore activates a critical condition for the robot 110, to which the robot 110 responds by going into high alert.

The robot 110 also checks one or more of an orientation of the pallet 280 and a size of the payload 281 and determines that overhanging objects outside the pallet boundary violate 5S regulations, thereby creating a critical condition for the robot 110, to which the robot 110 responds by going into high alert.

Figure 3:
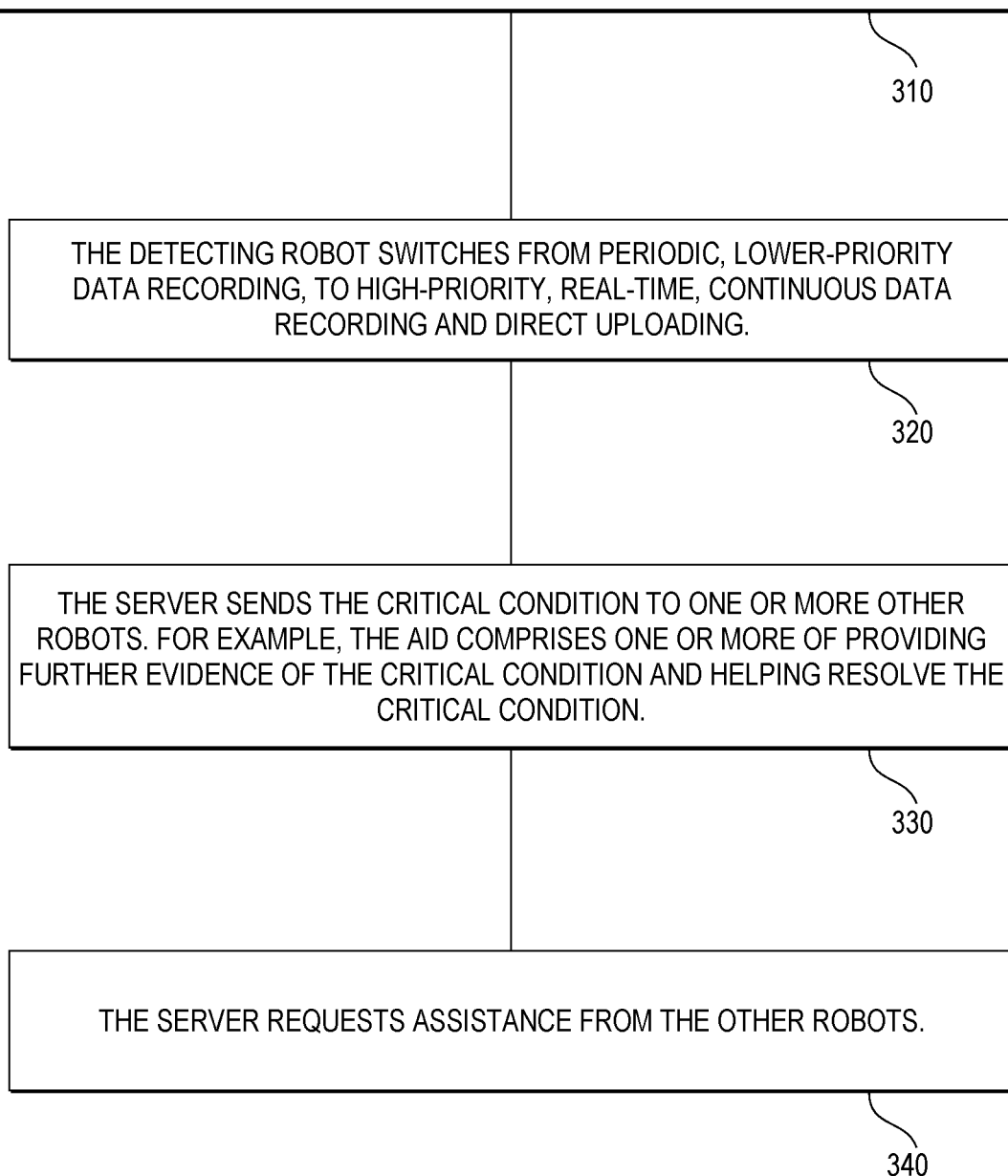
FIG. 3 is a flow chart illustrating a method for detecting a critical condition by an autonomous mobile robot using a system for facility monitoring and reporting to improve safety using one or more robots.

FIG. 3 is a flow chart illustrating a method 300 for detecting a critical condition by an autonomous mobile robot using a system for facility monitoring and reporting to improve safety using one or more robots.

The order of the steps in the method 300 is not constrained to that shown in FIG. 3 or described in the following discussion. Several of the steps could occur in a different order without affecting the final result.

In step 310, using a system comprising a network, the system further comprising a plurality of robots operating in a facility, the robots configured to monitor facility operation, the robots further configured to detect a critical condition, the robots operably connected to the network, the system further comprising a server operably connected to the robots over the network, wherein the robots are configured to regularly produce to the server a regular report under normal operating conditions, wherein the robots are further configured to produce to the server a critical condition report upon occurrence of the critical condition, the server receives, from a detecting robot, a critical condition detected by the detecting robot. For example, the critical condition is identified as occurring in a critical area. Block 310 then transfers control to block 320.

In step 320, the detecting robot switches from periodic, lower-priority data recording, to high-priority, real-time, continuous data recording and direct uploading. Block 320 then transfers control to block 330.

In step 330, the server sends the critical condition to one or more other robots. For example, the aid comprises one or more of providing further evidence of the critical condition and helping resolve the critical condition. Preferably, but not necessarily, the other robots are located in the critical area. Block 330 then transfers control to block 340.

In step 340, the server requests assistance from the other robots. Block 340 then terminates the process.

FIG. 4 is a flow chart illustrating a method 400 for detecting a critical condition by an autonomous mobile robot using a system for facility monitoring and reporting to improve safety using one or more robots.

The order of the steps in the method 400 is not constrained to that shown in FIG. 4 or described in the following discussion. Several of the steps could occur in a different order without affecting the final result.

In step 410, using a system comprising a network, the system further comprising a plurality of robots operating in a facility, the robots operably connected to the network, the robots configured to monitor facility operation, the robots further configured to detect a critical condition, wherein the robots are further configured to go into high alert upon detection of the critical condition, the system further comprising a server operably connected to the robots over the network, wherein the robots are configured to regularly produce to the server a regular report under normal operating conditions, wherein the robots are further configured to produce to the server a critical condition report upon occurrence of the critical condition, the server receives, from a detecting robot, a critical condition detected by the detecting robot. Block 410 then transfers control to block 412.

In step 412, the server requests data regarding the critical condition from a robot. For example, the server requests the data from the detecting robot. For example, the server requests the data from a robot that is nearest to the critical condition. Block 412 then transfers control to block 415.

In step 415, the server displays, on a user interface (UI) visible to a user, the UI operably connected to the server, the critical condition. Block 415 then transfers control to block 420.

In step 420, the server generates a heat map of the critical condition. Block 420 then transfers control to block 425.

In step 425, the server generates a path usable by the robots around the critical condition. Block 425 then transfers control to block 430.

In step 430, the server switches the detecting robot from periodic, lower-priority data recording, to high-priority, real-time, continuous data recording and direct uploading. Block 430 then transfers control to block 435.

In step 435, the server sends the critical condition to one or more other robots. Block 435 then transfers control to block 440.

In step 440, the server requests assistance for the detecting robot from the other robots. Block 440 then transfers control to block 445.

In step 445, the server receives, from the determining robot, a determination that one or more of the critical condition and a number of robots near the critical condition is problematic. Block 445 then transfers control to block 450.

In step 450, the server sends to one or more other robots a command blocking the one or more other robots from approaching the critical condition. Block 450 then transfers control to block 455.

In step 455, the server receives from a user an instruction regarding preventive measures to resolve the critical condition. Block 455 then transfers control to block 460.

In step 460, the server implements the user's instruction regarding the preventive measures to resolve the critical condition. Block 460 then transfers control to block 470.

In step 470, the server sends to the UI for display a robot selection panel comprising a plurality of robots usable to approach the critical condition. Block 470 then transfers control to block 480.

In step 480 the server receives from the UI a user selection of a robot from the robot selection panel. Block 480 then transfers control to block 490.

In step 490, the server transmits to each of the user-selected robots, a respective instruction instructing each of the user-selected robots to approach the critical condition. Block 490 then terminates the process.

FIGS. 5A-5F are a set of diagrams illustrating a method 500 for detecting a critical condition by an autonomous mobile robot using a system for facility monitoring and reporting to improve safety using one or more robots.

The order of the steps in the method 500 is not constrained to that shown in FIG. 5 or described in the following discussion. Several of the steps could occur in a different order without affecting the final result.

As shown in FIG. 5A, in step 503, a first robot 110A comprises a first sensor 220A. A second robot 110B comprises a second sensor 220B. The first robot 110A detects a first human 240A using the first sensor 220A. The first robot 110A also detects the second robot 110B using the first sensor 220A. The first sensor 220A detects the first human 240A using the first robot detection beam 230A. The first sensor 220A detects the second robot 110B using the second robot detection beam 230B. The first robot 110A determines that a distance 504 between the first human 240A and the second robot 110B is smaller than is acceptable based on one or more of user-defined criteria and predefined criteria, creating a critical condition 504. For example, and as depicted, the critical condition 504 comprises a near miss between the second robot 110B and the first human 240A. The first sensor 220A detects the forklift 210 using the third robot detection beam 230C. Block 503 then transfers control to block 505.

Figure 5B:
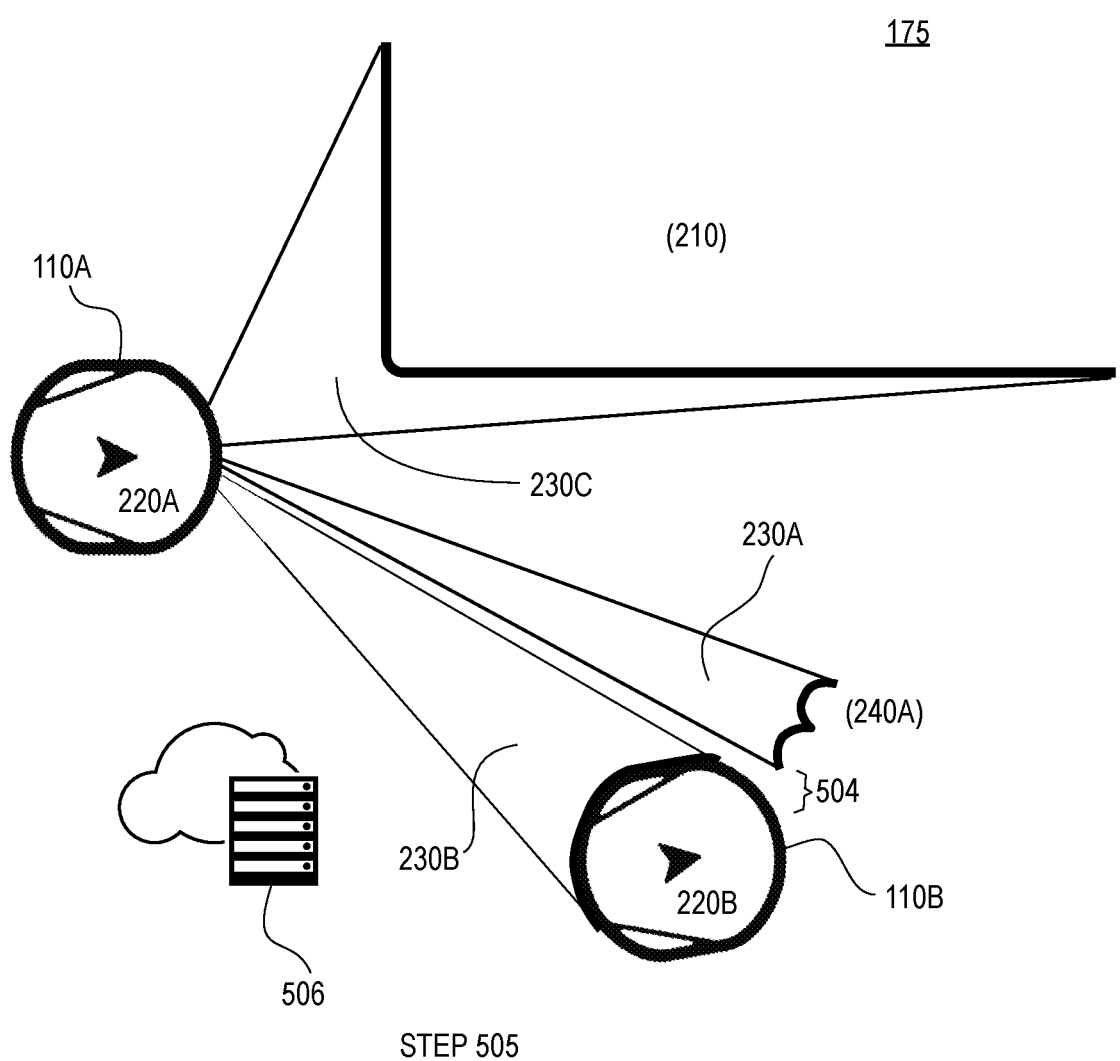

As shown in FIG. 5B, in step 505, a user interface (UI) 175 displays the same scene that was shown above in three dimensions (3D) in step 503. Visible in the UI 175 are the first robot 110A, the second robot 110B, and a server 506 that operably connects the first robot 110A and the second robot 110B. On the UI 175, the critical condition 504 is visible. On the UI 175, visible in outline of the scanned imaging by the first sensor 220A of the first robot detection beam 230A is the first human 240A. On the UI 175, visible in outline of the scanned imaging by the first sensor 220A of the second robot detection beam 230B is the second robot 110B. On the UI 175, also visible in outline of the scanned imaging by the first sensor 220A of the third robot detection beam 230C is the forklift 210. Block 505 then transfers control to block 507.

Figure 5C:
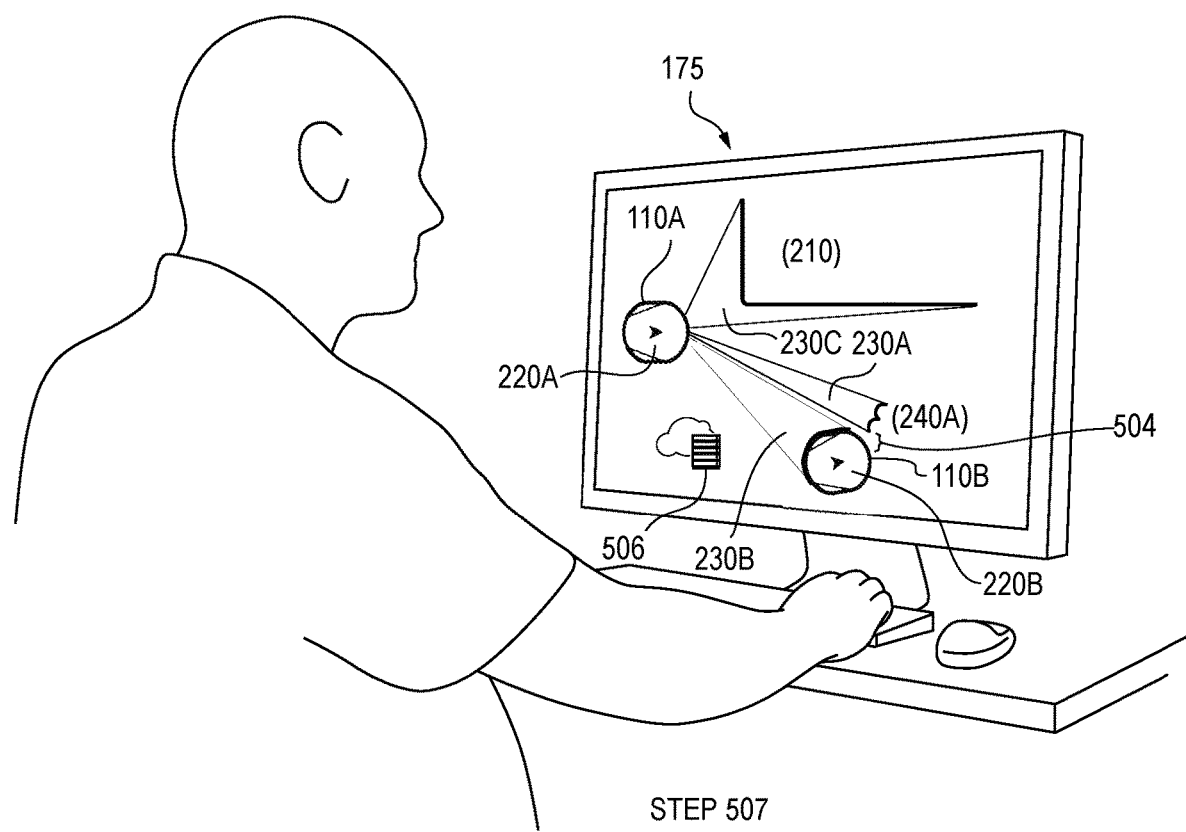

As shown in FIG. 5C, in step 507, a user 508 is viewing on the UI 175 the same scene that was shown in step 505. Visible again in the UI 175 are the first robot 110A, the second robot 110B, and the server 506 that operably connects the first robot 110A and the second robot 110B. Again on the UI 175, visible to the user 508 in outline of the scanned imaging by the first sensor 220A of the first robot detection beam 230A is the first human 240A. Again on the UI 175, visible to the user 508 in outline of the scanned imaging by the first sensor 220A of the third robot detection beam 230B is the forklift 210. Block 507 then transfers control to block 509.

Figure 5D:
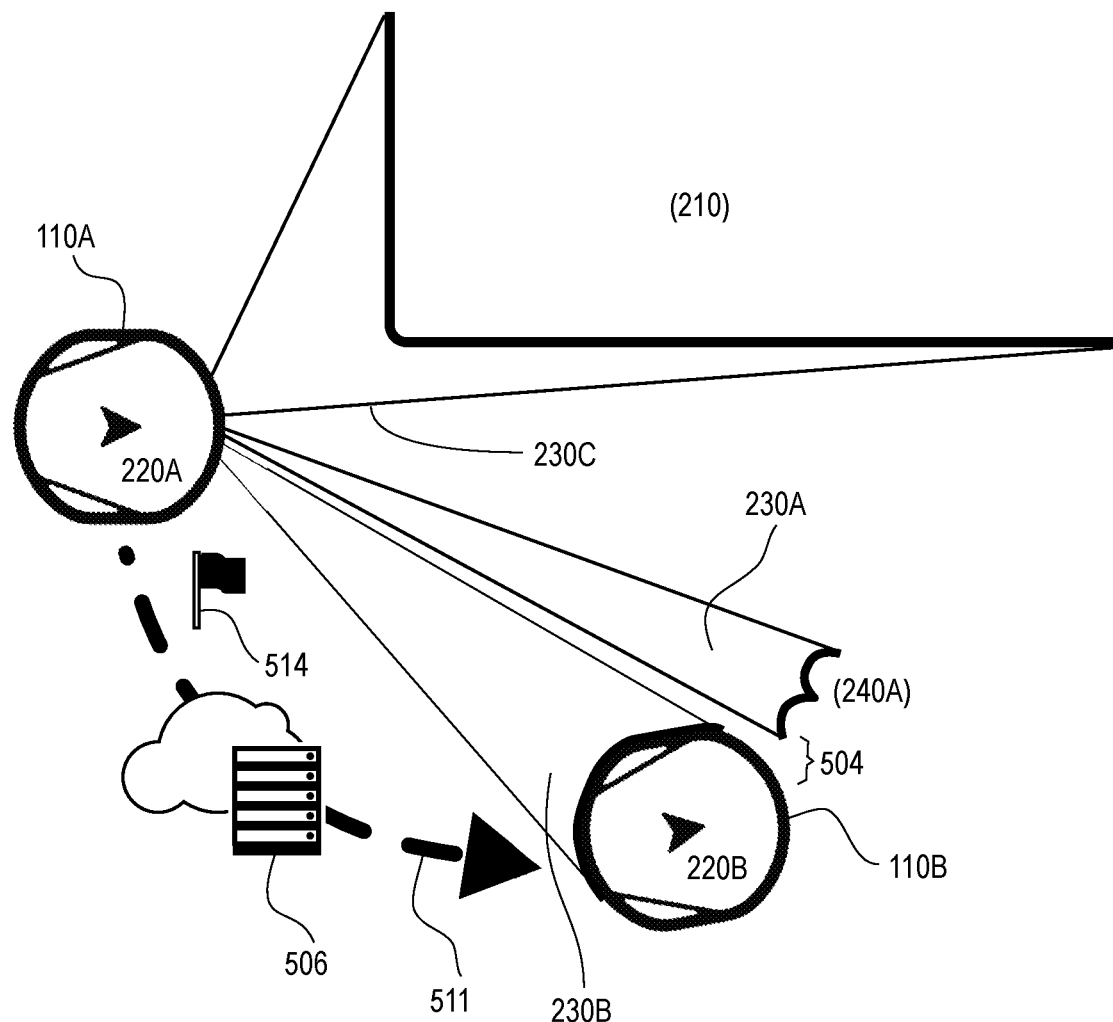

As shown in FIG. 5D, in step 509, because of the near miss 504 of the first human 240A and the second robot 110B, the first robot 110A activates a critical condition for the robots 110A and 110B, to which the robots 110A and 110B respond by going into high alert. The UI 175 displays the first robot 110A sending to the second robot 110B via the server 506 its detection of the near miss of the first human 240A and the second robot 110B. The first robot 110A notifies the server 506 in a first-robot-to-server transmission 510 of its detection of the critical condition. The server declares a critical condition and the UI 175 displays a warning flag 514. The server 506 forwards the warning flag 514 in a server-to-second-robot instruction 511 to the second robot 110B. Shown again are the first robot detection beam 230A, the second robot detection beam 230B, and visible in outline of the scanned imaging by the first sensor 220A of the third robot detection beam 230C is the forklift 210. Block 509 then transfers control to block 512.

Figure 5E:
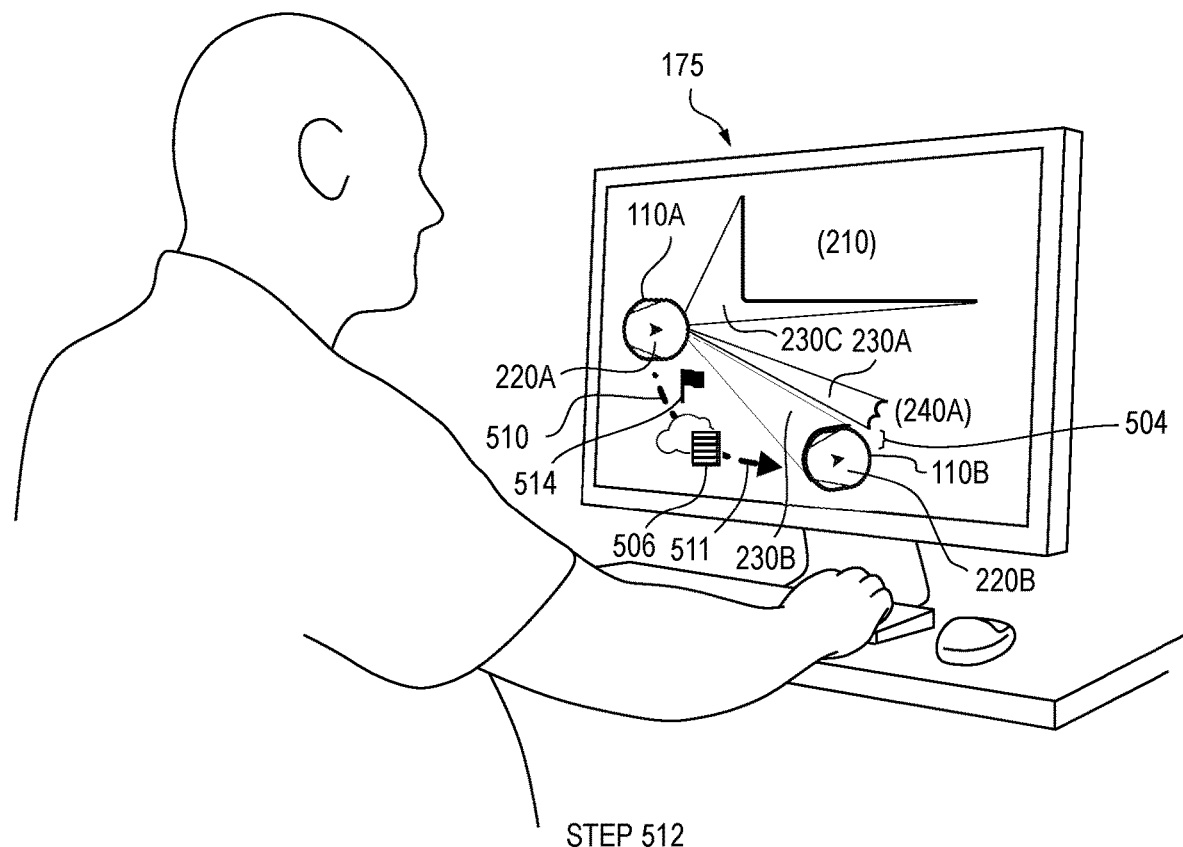

As shown in FIG. 5E, in step 512, the user 508 is viewing on the UI 175 the same scene that was shown in step 505. Visible again in the UI 175 are the first robot 110A, the second robot 110B, the critical condition 504, the server 506, the first-robot-to-server transmission 510 to the server 506, and the server-to-second-robot instruction 511. Again on the UI 175, visible to the user 508 in outline of the scanned imaging by the first sensor 220A of the first robot detection beam 230A is the first human 240A. Again on the UI 175, visible to the user 508 in outline of the scanned imaging by the first sensor 220A of the third robot detection beam 230B is the forklift 210. Block 512 then transfers control to block 515.

Figure 5F:
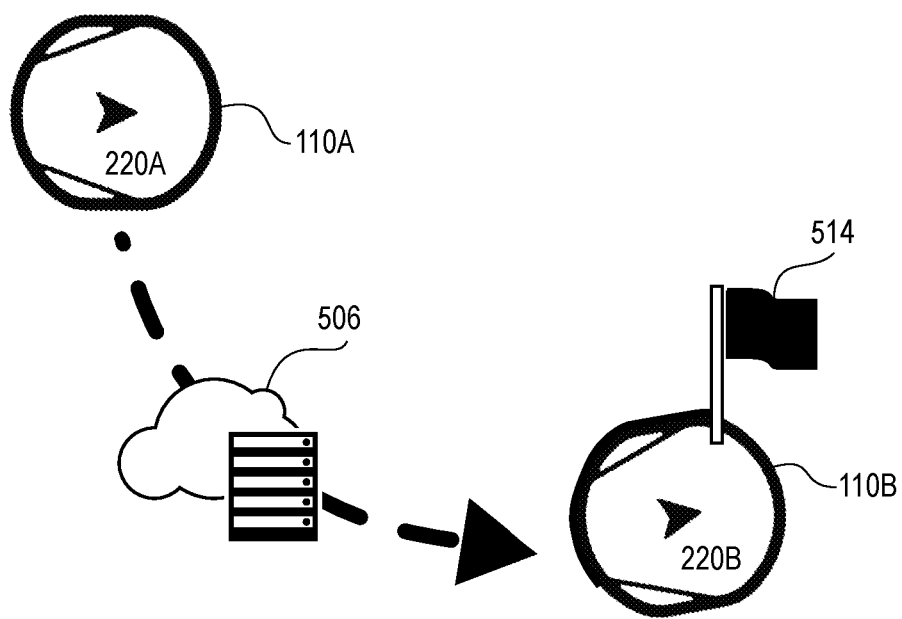

As shown in FIG. 5F, in step 515, the server 506 posts the warning flag 514 on the second robot 110B in the UI 175. In response to the critical condition, one or more of the first robot 110A and the second robot 110B record data using their respective sensors 220A and 2220B. In response to the critical condition, one or more of the first robot 110A and the second robot 110B switch from periodic, lower-priority data recording, to high-priority, real-time, continuous data recording and direct uploading. The first robot 110A sends the critical condition to other robots in a critical area of the critical condition, requesting their aid in providing further evidence of the critical condition. The first robot 110A asks nearby robots to collect sensor data of the environment around the near miss 504. The first robot 110A starts recording data and tries to keep the near miss 504 in view by updating its local plan while doing the task. The robots 110A, 110B record the data for one or more of a user-specified time and a predetermined time. The robots 110A, 110B then upload the collected data to the cloud. Following completion of data collection, a notification is sent to the user 508 in the UI 175 allowing the user to do one or more of view the data and decide on preventive measures to resolve the critical condition 504. Block 515 then terminates the process.

FIG. 6 is a flow chart illustrating a method 600 for detecting a critical condition using a system for facility monitoring and reporting to improve safety using one or more robots.

Figure 6A:
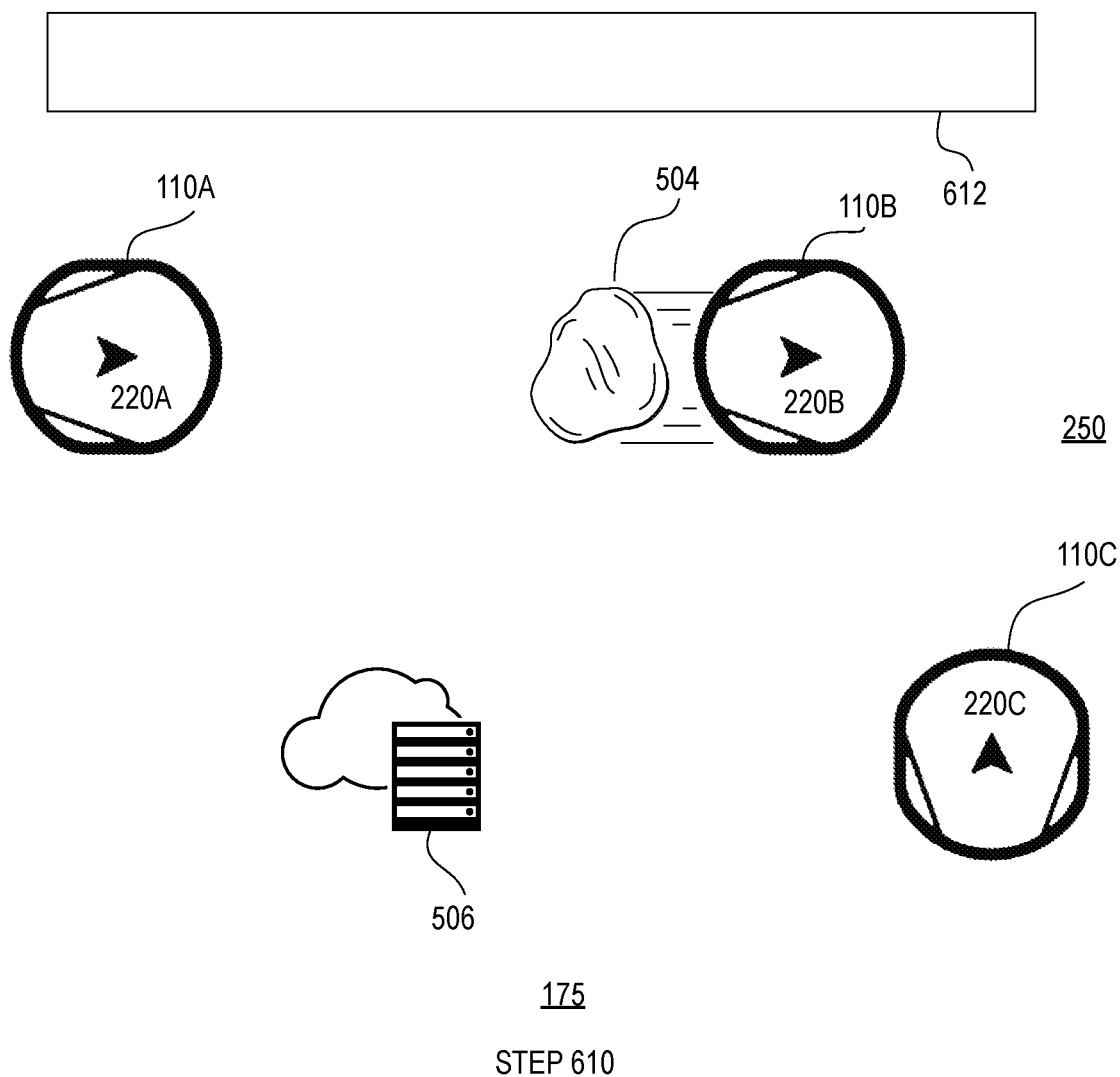
FIGS. 6A-6O are a set of diagrams illustrating a method for detecting a critical condition by an autonomous mobile robot using a system for facility monitoring and reporting to improve safety using one or more robots.

As shown in FIG. 6A, in step 610, a facility 250 depicted in a user interface 175 comprises three robots, a first robot 110A, a second robot 110B, and a third robot 110C are navigating, performing tasks, and watching for appearance of critical conditions 504. The robots 110A-110C comprise respective sensors 220A-220C. The facility 250 further comprises the server 506. The facility 250 further comprises a rack 612 configured to store goods (not shown). A second robot 110B learns of a nearby critical condition 504. The critical condition 504 comprises an oil spill 504. For example, the second robot 110B learns of the oil spill 504 after the second robot 110B slips on the oil spill 504. Block 610 then transfers control to block 615.

Figure 6B:
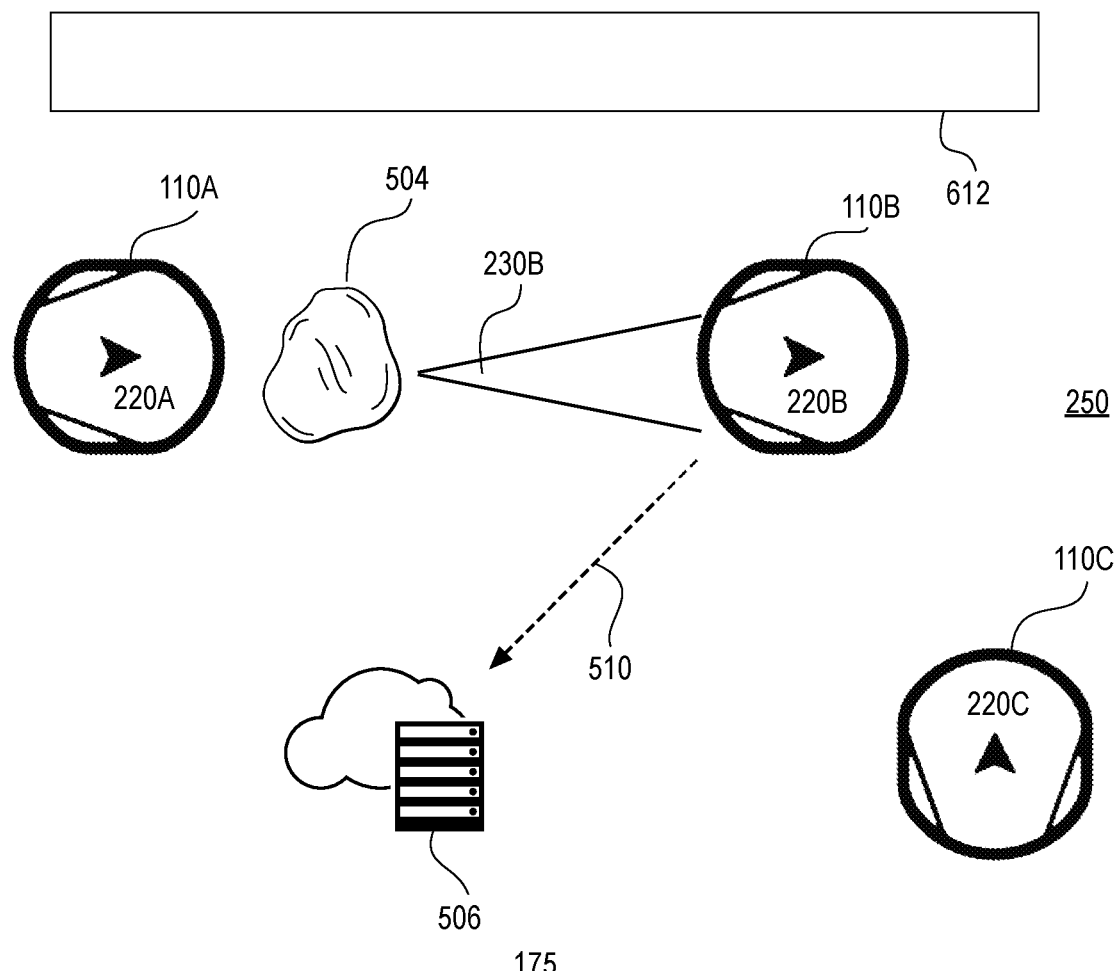

As shown in FIG. 6B, in step 615, the second robot 110B notifies the server 606 in a second-robot-to-server transmission 610B of its detection of the critical condition 504. Using its sensor 220B, the second robot 110B observes the critical condition 504 using a second robot detection beam 230B. Also shown again are the first robot 110A, the third robot 110C, the UI 175, the respective sensors 220A-220C, the facility 250, and the rack 612. Block 615 then transfers control to block 618.

Figure 6C:
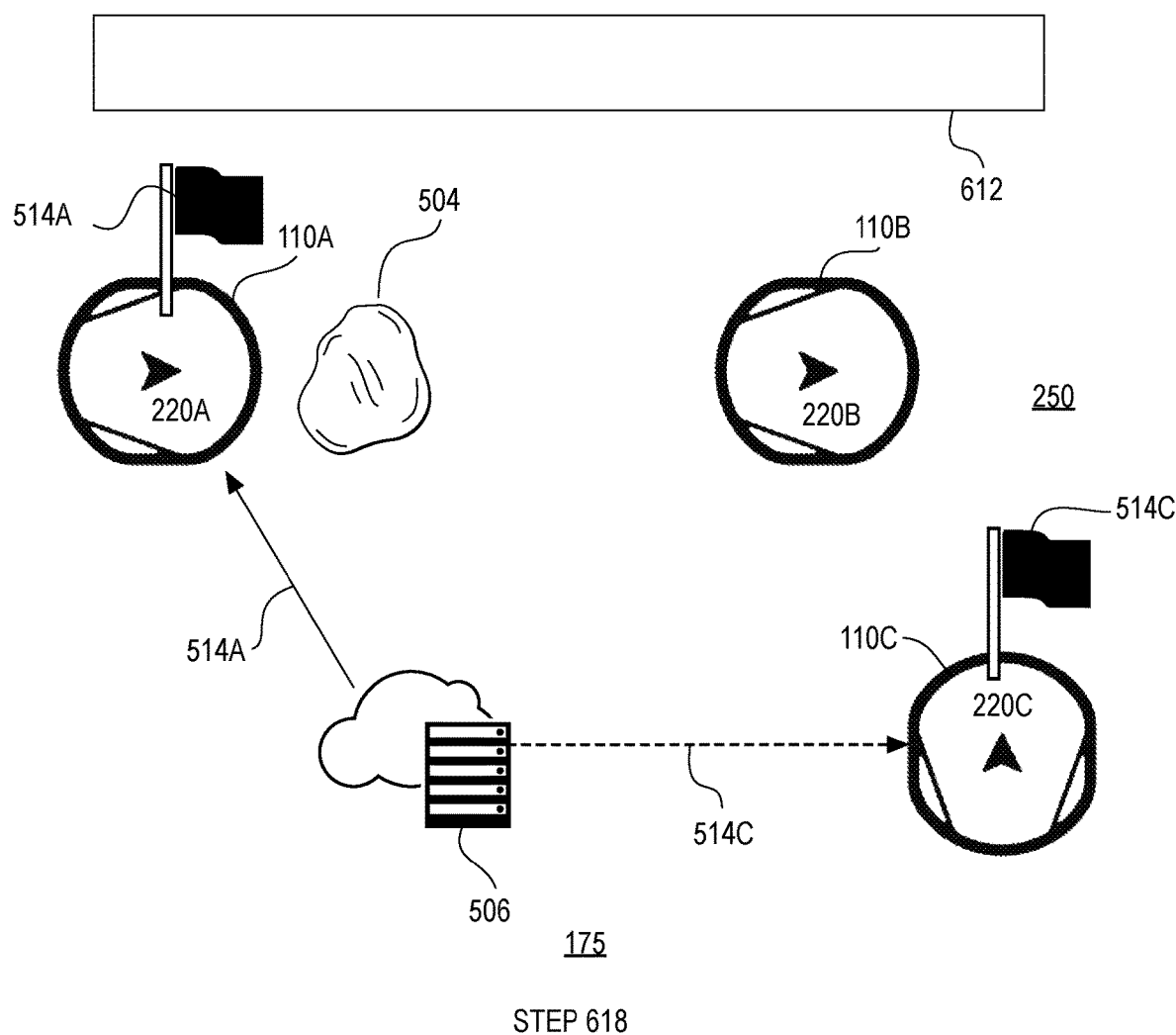

As shown in FIG. 6C, in step 618, the server 506 sends to the first robot 110A a first warning flag 514A in a server-to-first-robot instruction 511A advising the first robot 110A of the critical condition 504. The server also sends to the third robot 110C a third warning flag 514C in a server-to-third-robot instruction 511C advising the third robot 110C of the critical condition 504. Also shown again are the second robot 110B, the respective sensors 220A-220C, the facility 250, the critical condition 504, and the rack 612. In step 618, the server 506 optionally instructs one or more of the first robot 110A and the third robot 110C to capture data from the critical condition 504. For example, the server 506 instructs the first robot 110A to capture an image of the critical condition 504. Also shown again are the second robot 110B, the UI 175, the respective sensors 220A-220C, the facility 250, and the rack 612. Block 618 then transfers control to block 620.

Figure 6D:
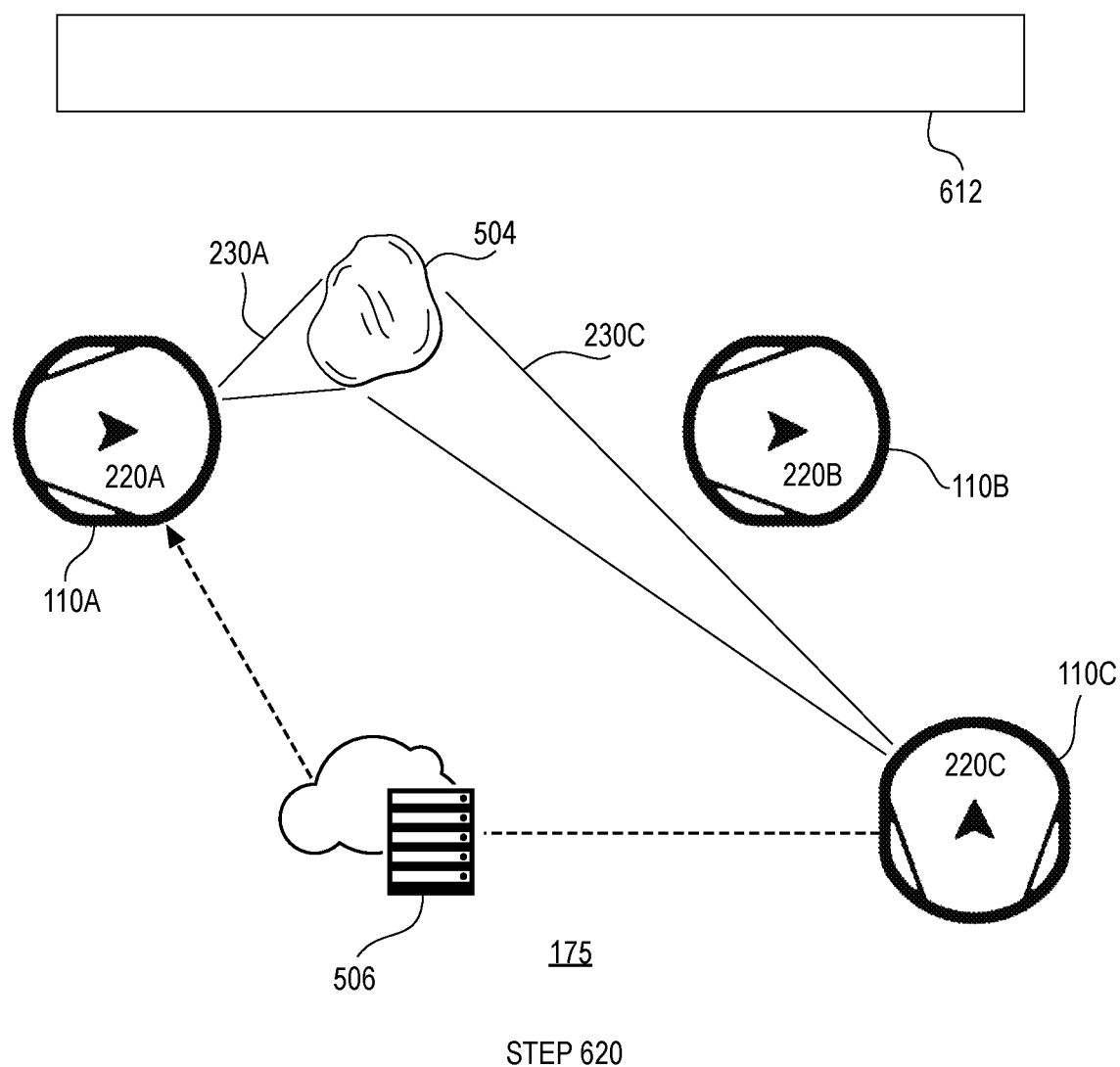

As shown in FIG. 6D, in step 620, the first robot 110A observes the critical condition 504 using a first robot detection beam 230A. The third robot 110C observes the critical condition 504 using a third robot detection beam 230C. Also shown again are the UI 175, the facility 250 and the rack 612. Block 620 then transfers control to block 625.

Figure 6E:
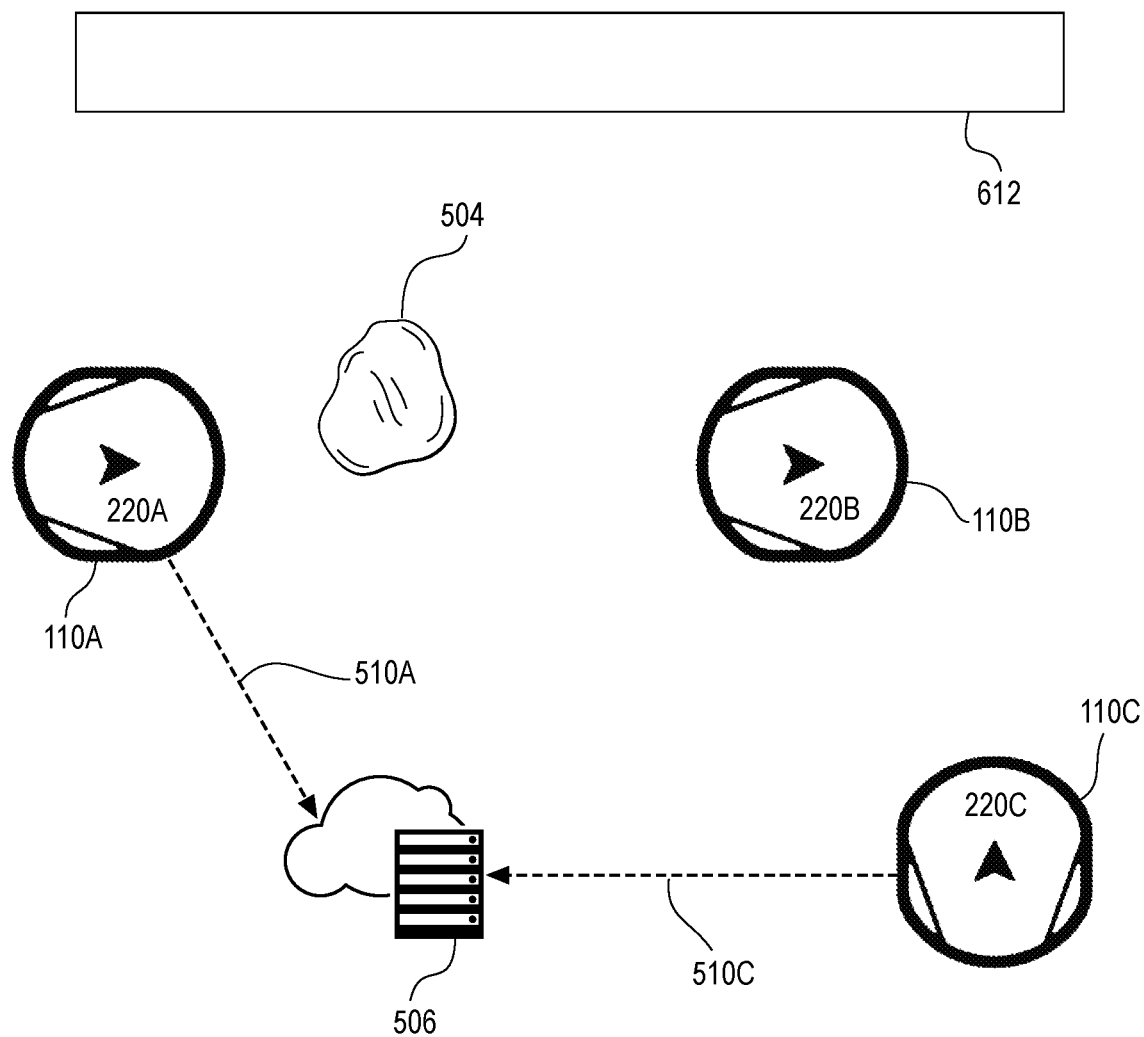

As shown in FIG. 6E, in step 625, the first robot 110A uploads to the server 506 in a first-robot-to-server transmission 510A of its observations of the critical condition 504. The third robot 110C uploads to the server 506 in a third-robot-to-server transmission 510C of its observations of the critical condition 504. Also shown again are the second robot 110B, the UI 175, the respective sensors 220A-220C, the facility 250, and the rack 612. Block 625 then transfers control to block 630.

Figure 6F:
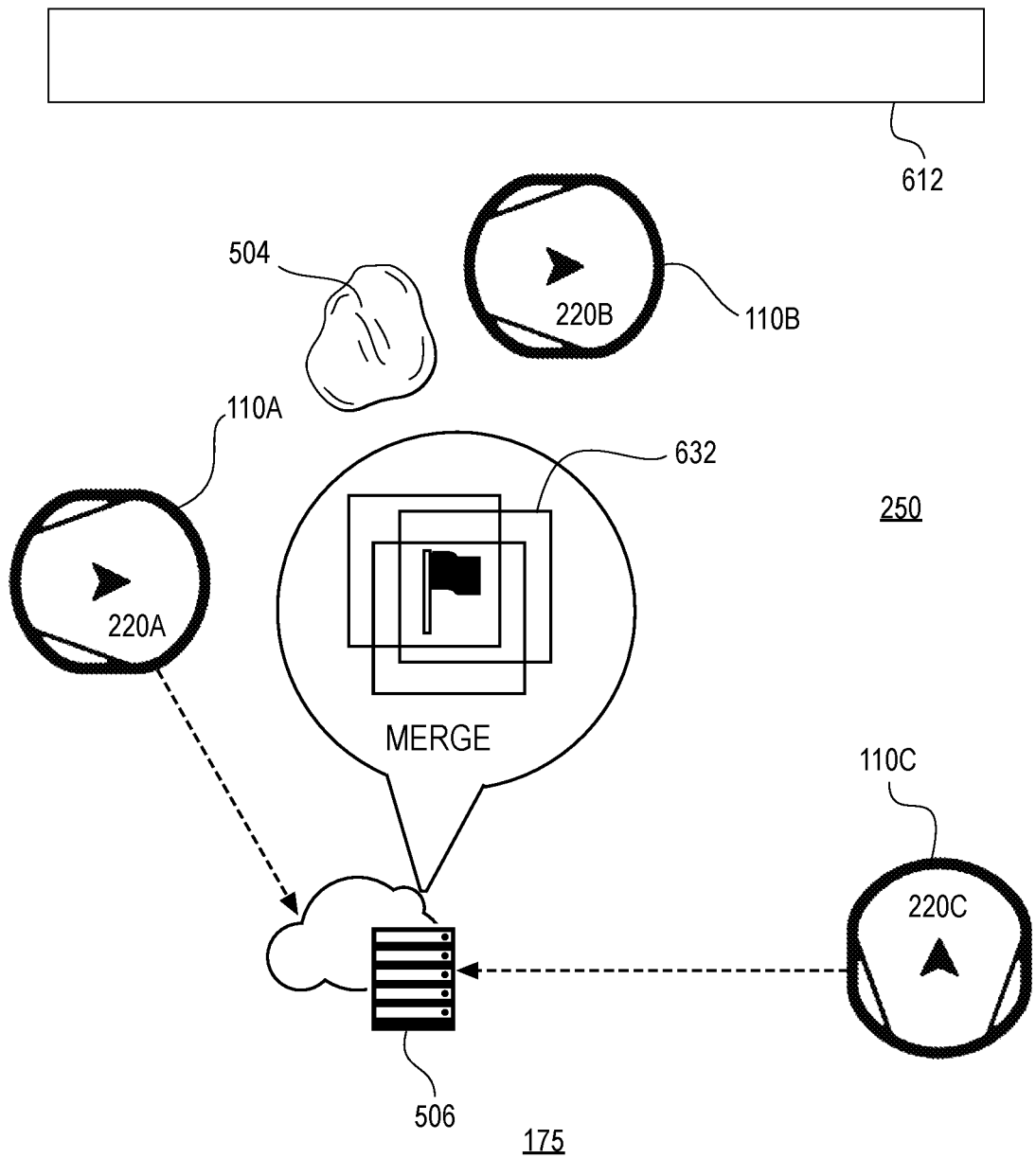

As shown in FIG. 6F, in step 630, the server 506 merges the data about the critical condition 504 from the first robot 110A, the second robot 110B, and the third robot 110C, creating a critical condition warning flag 632. Also shown again are the UI 175, the respective sensors 220A-220C, the facility 250, and the rack 612. Block 630 then transfers control to block 635.

Figure 6G:
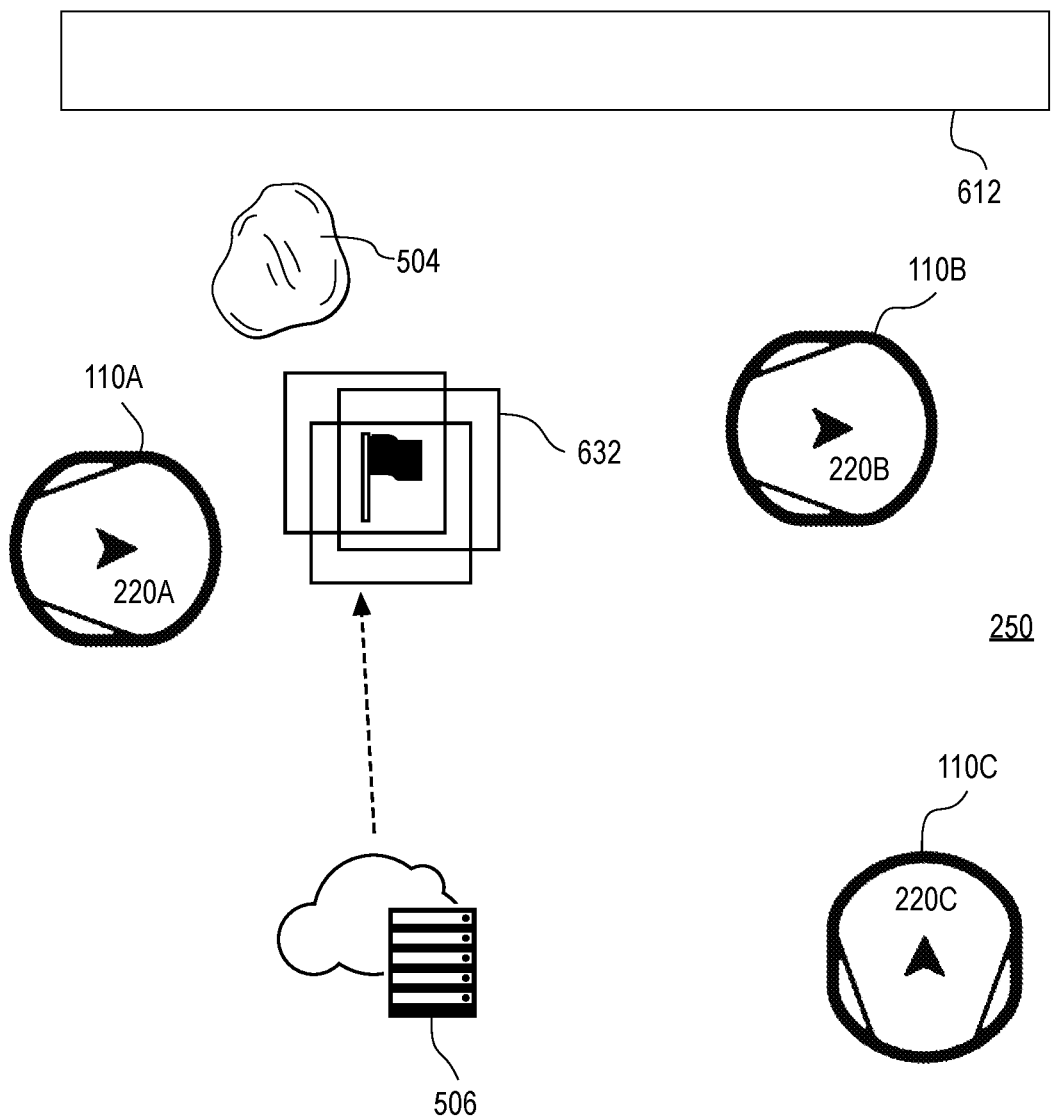

As shown in FIG. 6G, in step 635, the server 506 uploads the data on the critical condition 504. The server 506 places the critical condition warning flag 532 near the critical condition 504. Also shown again are the first robot 110A, the second robot 110B, the third robot 110C, the respective sensors 220A-220C, the facility 250, the critical condition 504, and the rack 612. Block 635 then transfers control to block 640.

Figure 6H:
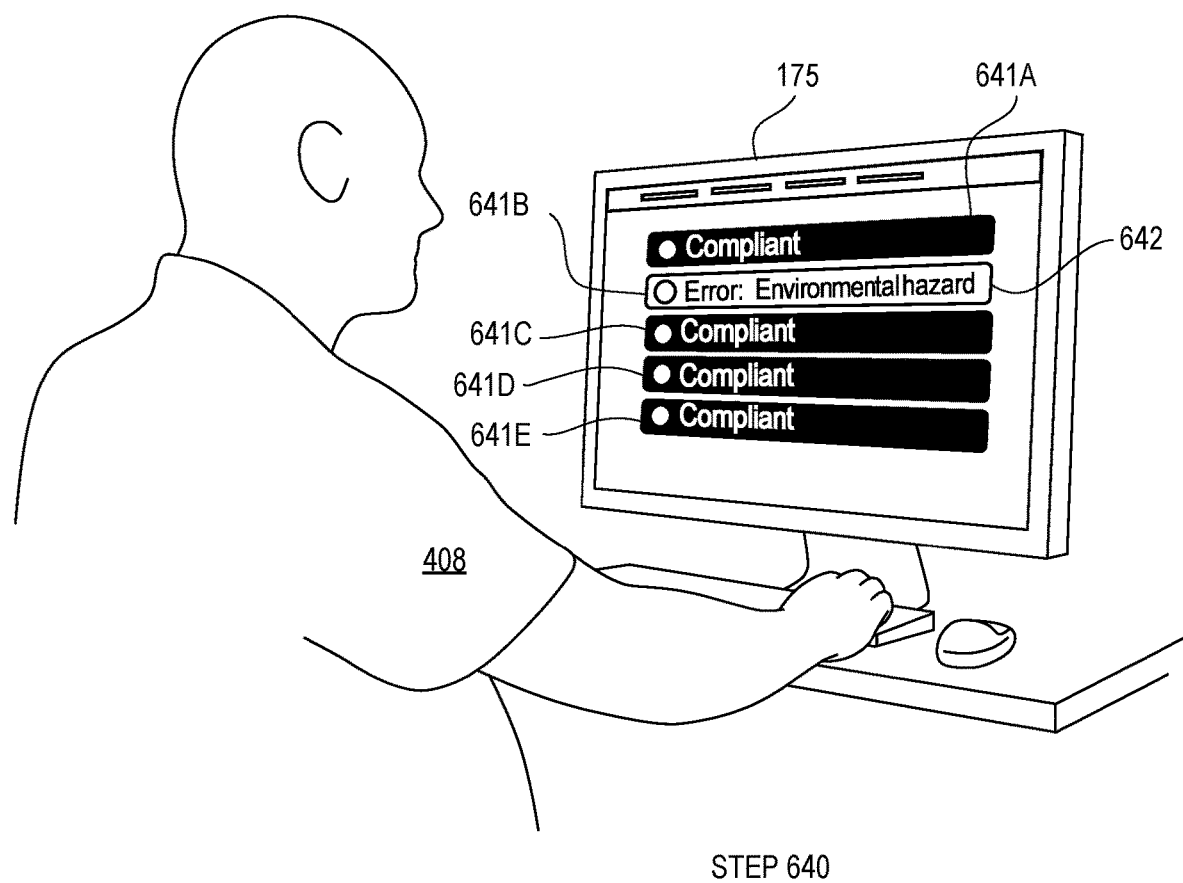

As shown in FIG. 6H, in step 640, the UI 175 displays to the user 508 compliance levels with each of five previously designated safety rules 641A-641E. Through the UI 175, the user 508 receives a critical condition notification 642 from the server (not shown in this figure) via the UI 175 informing the user 508 of the critical condition (not shown in this figure). Using the data presented by the UI 175, the user 508 determines a likely cause of the critical condition (not shown in this figure). Block 640 then transfers control to block 650.

Figure 6I:
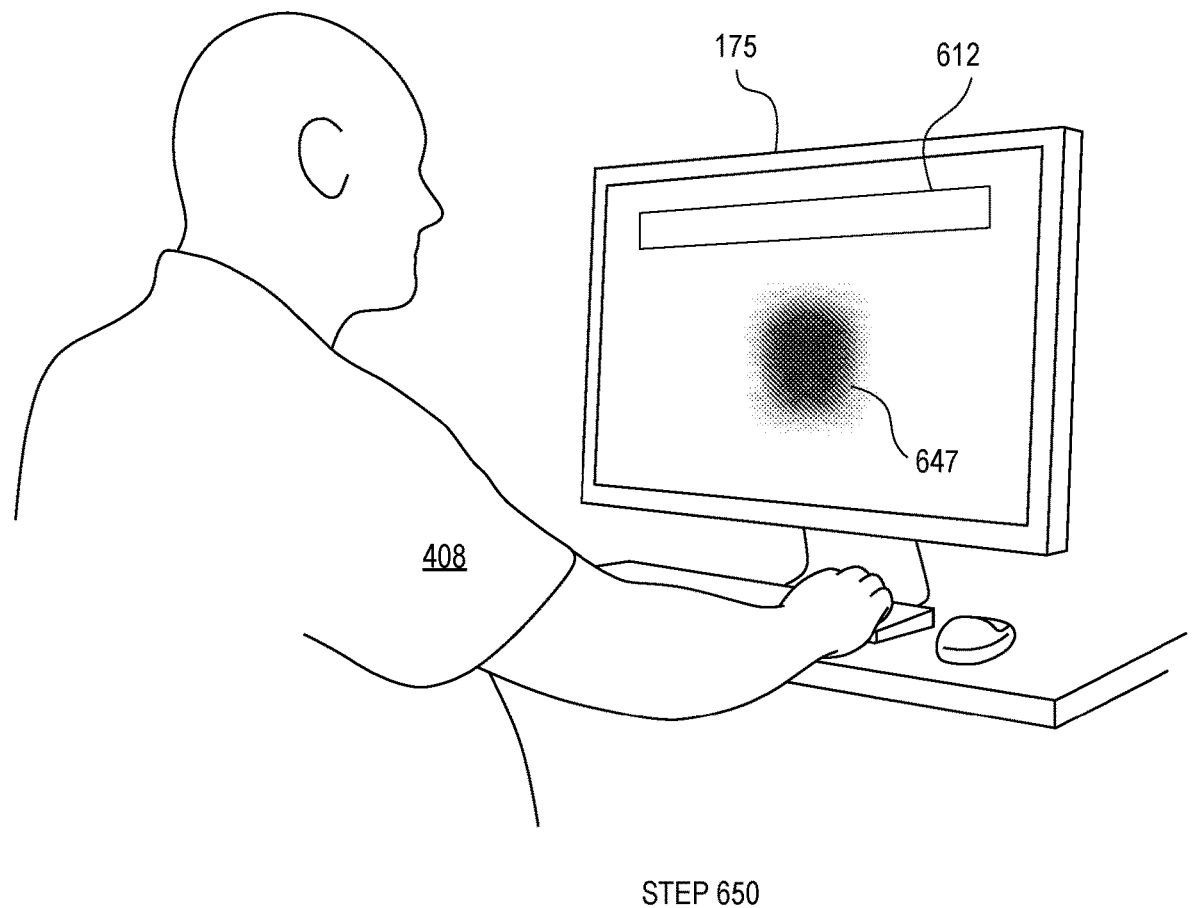

As shown in FIG. 6I, in step 650, the UI 175 accesses data in a database. The UI 175 displays to the user 508 a heat map 647 of the critical condition (not shown in this figure). For example, the heat map 647 shows one or more of a location and a frequency of the critical condition (not shown in this figure). Also shown again is the rack 612. Block 650 then transfers control to block 655.

Figure 6J:
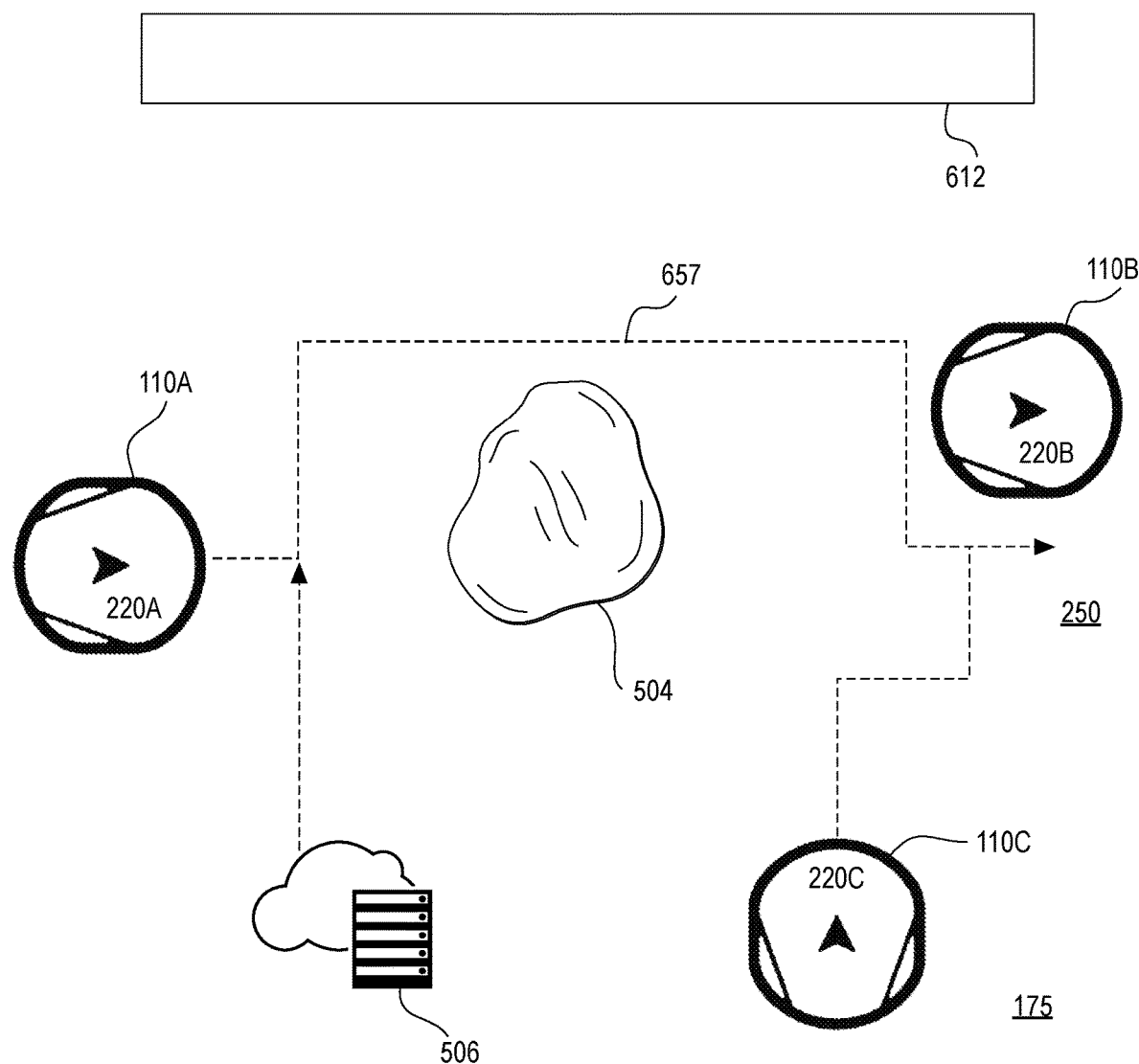

As shown in FIG. 6J, in step 655, through the UI 175, the server 506 generates a first robot path f for the first robot 110A around the critical condition 504. Also shown are the second robot 110B, the third robot 110C, and the rack 612. The server 506 may then send the path around the critical condition 504 to the UI 175 for display. Also shown again is the rack 612. Block 655 then transfers control to block 660.

Figure 6K:
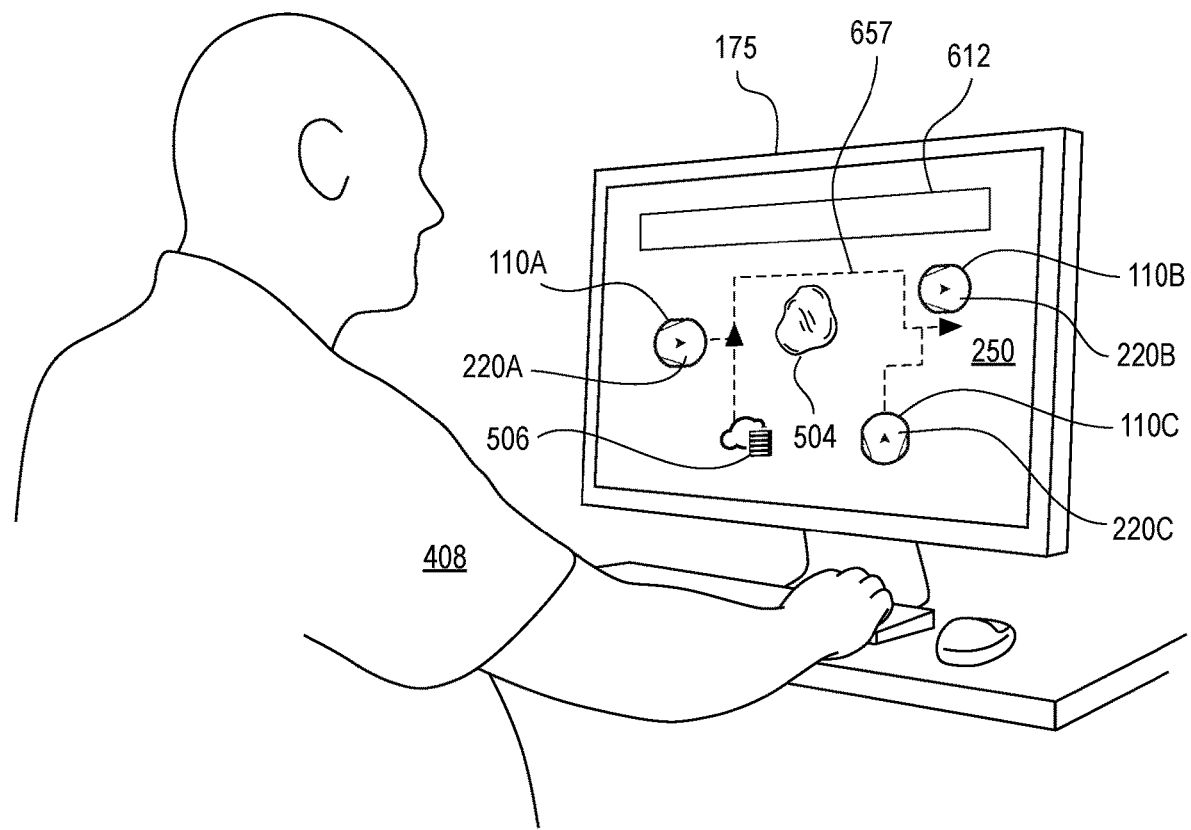

As shown in FIG. 6K, in step 660, the UI 175 displays to the user 508 the first robot path 657 around the critical condition 504. Also shown again are the facility 250 and the rack 612. Block 660 then transfers control to block 670.

Figure 6L:
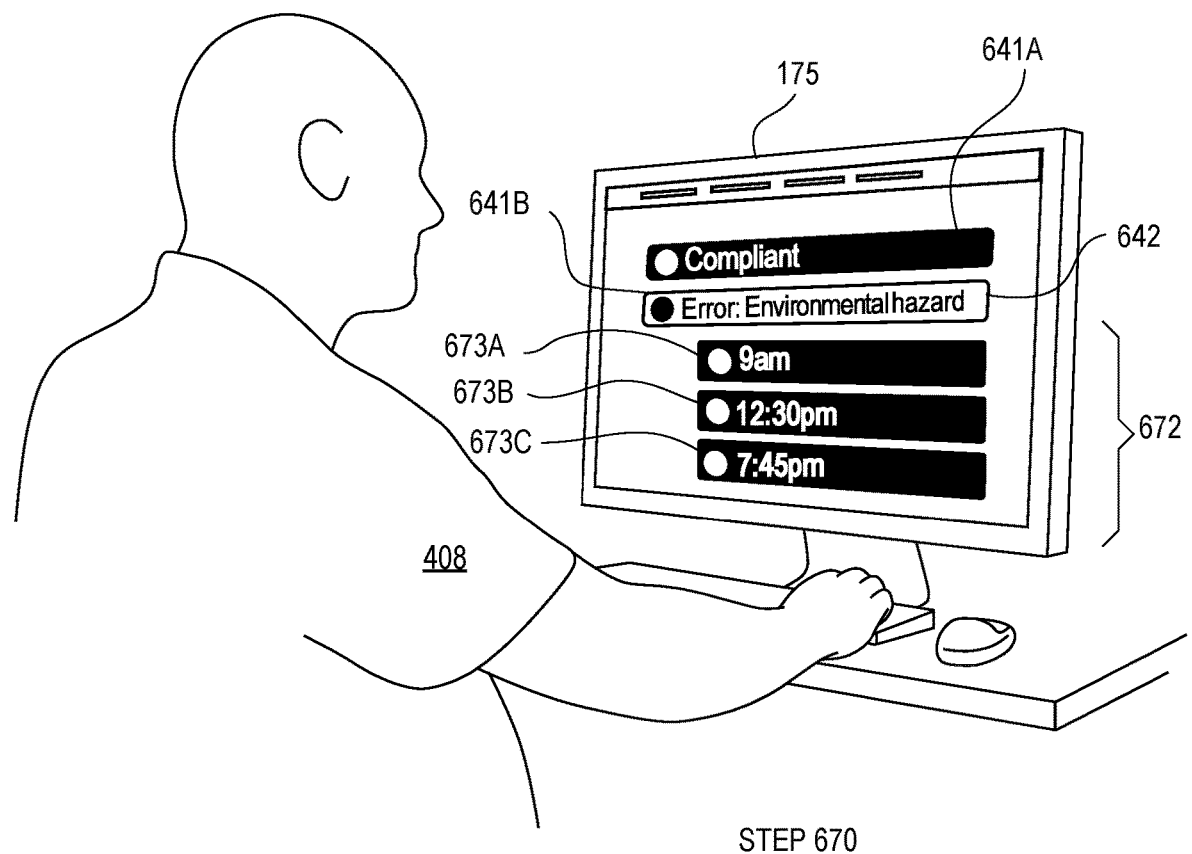

As shown in FIG. 6L, in step 670, the UI 175 displays to the user 508 the first safety rule 641A and the second safety rule 641B, and the critical condition notification 642. The server (not shown in this figure) generates a time profile of the critical condition (not shown in this figure). The server (not shown in this figure) sends the time profile to the UI 175 for display. The user highlights the critical condition notification 642 and the UI 175 opens the time profile 672 of a time evolution of the critical condition (not shown in this figure). The time profile 672 provides the user 508 with a time series visualization of the critical condition (not shown in this figure). The time series visualization allows the user 508 to see how the critical condition (not shown in this figure) evolves across time. The time profile 672 comprises a first critical condition time tab 673A, a second critical condition time tab 673B, and a third critical condition time tab 673C. The first critical condition time tab 673A comprises a time 9 am. The second critical condition time tab comprises a time 12:30 pm. The third critical condition time tab comprises a time 7:45 pm. invites the user 508 to request data about the critical condition (not shown in this figure). The user 508 can select any time tab 673A-673C of interest to learn further information about the evolution at the selected time 673A-673C of the critical condition (not shown in this figure). Block 670 then transfers control to block 680.

Figure 6M:
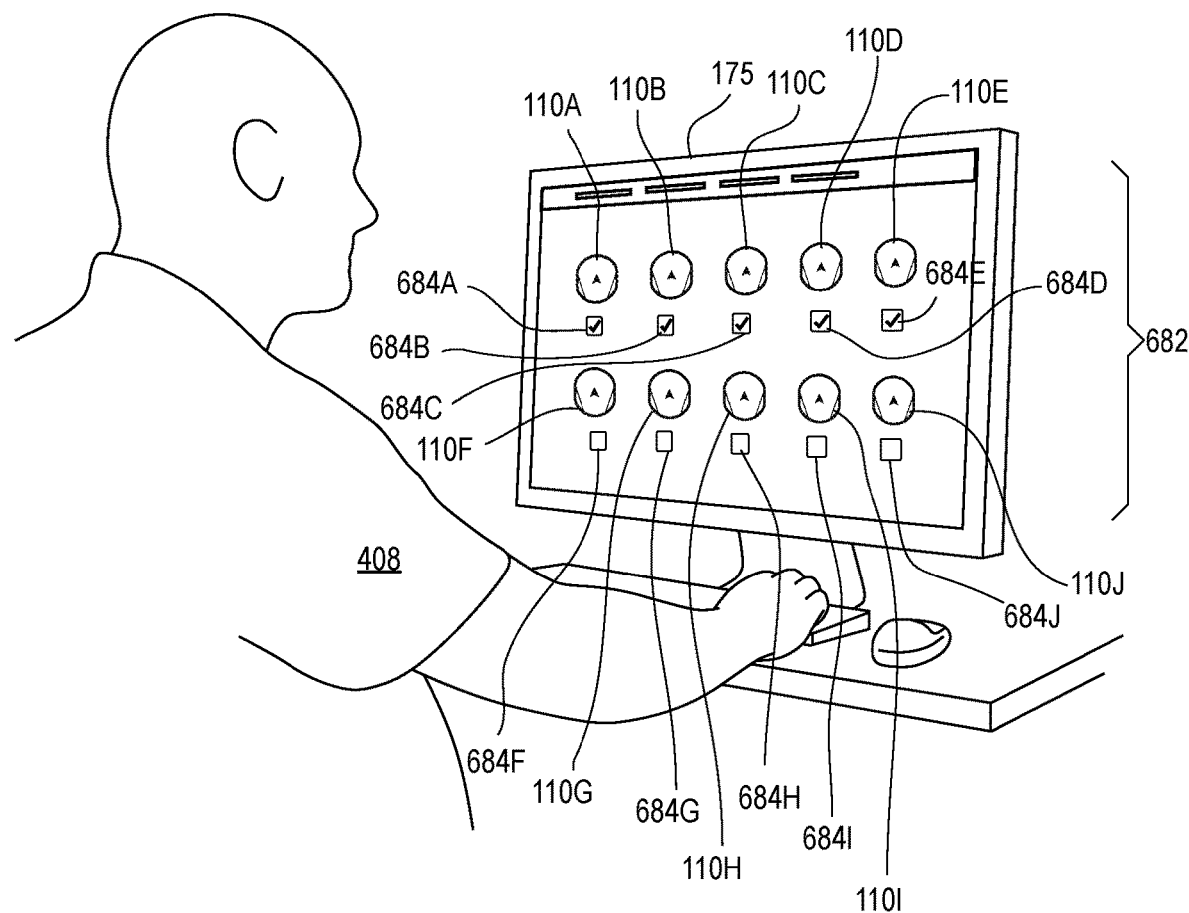

As shown in FIG. 6M, in step 680, the UI 175 displays to the user 508 a robot selection panel 682. The robot selection panel 682 comprises a plurality of robots 110A-110J, the plurality of robots 110A-110J usable to approach the critical condition 504. The robot selection panel 682 further comprises a robot checkbox 684A-684J adjacent to each of the plurality of robots 110A-110J. The user 508 selects the first five robot checkboxes 684A-684E, indicated that the user 508 selects each of the first five robots 110A-110E, and further indicating that the user 508 does not select any of the second five robots 110F-110J. Block 680 then transfers control to block 685.

Figure 6N:
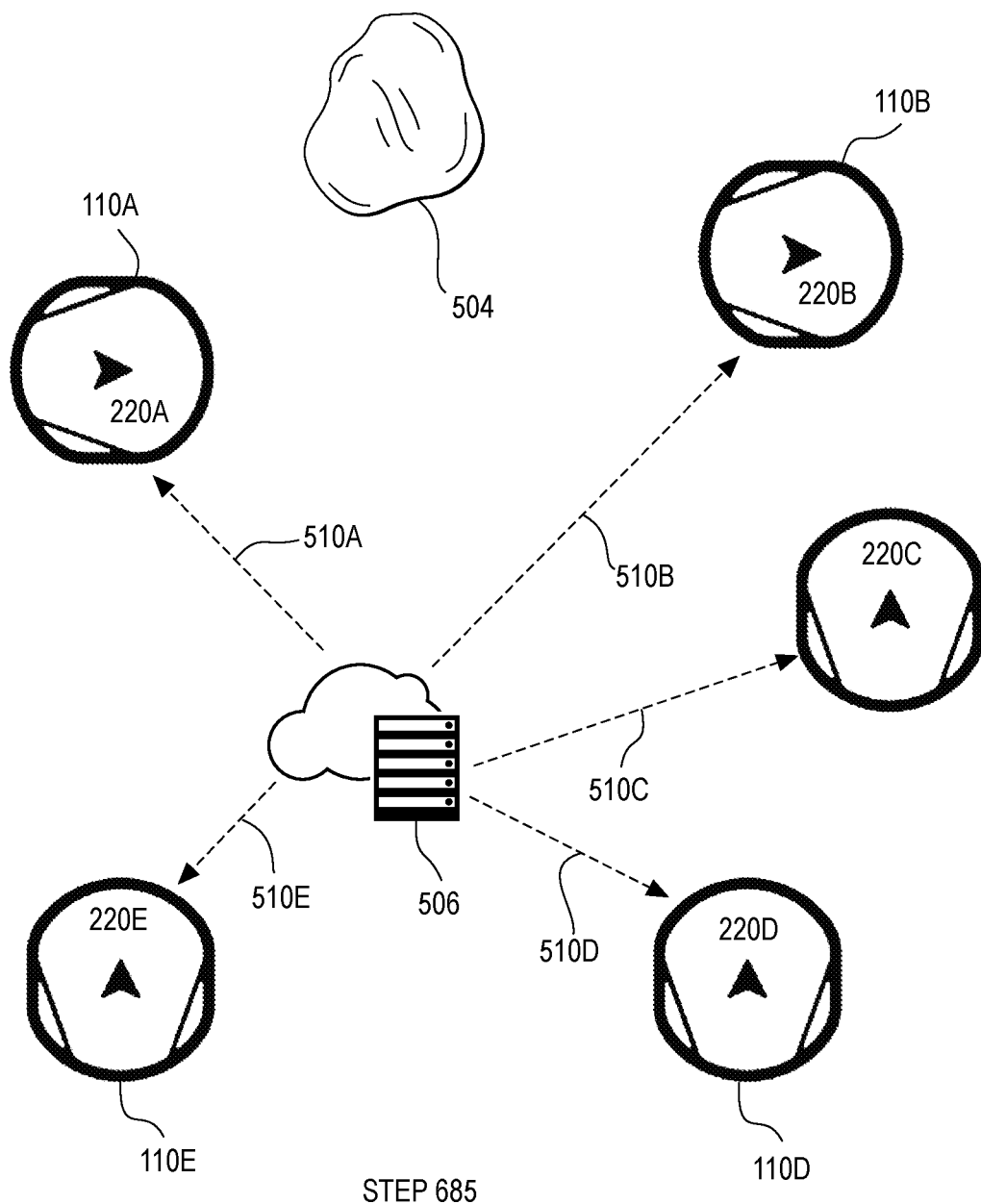

As shown in FIG. 6N, in step 685, the system transmits to each of the user-selected robots 110A-110E a respective instruction 510A-510E instructing each of the user-selected robots 110A-110E to approach the critical condition 504. Block 685 then transfers control to block 690.

Figure 6O:
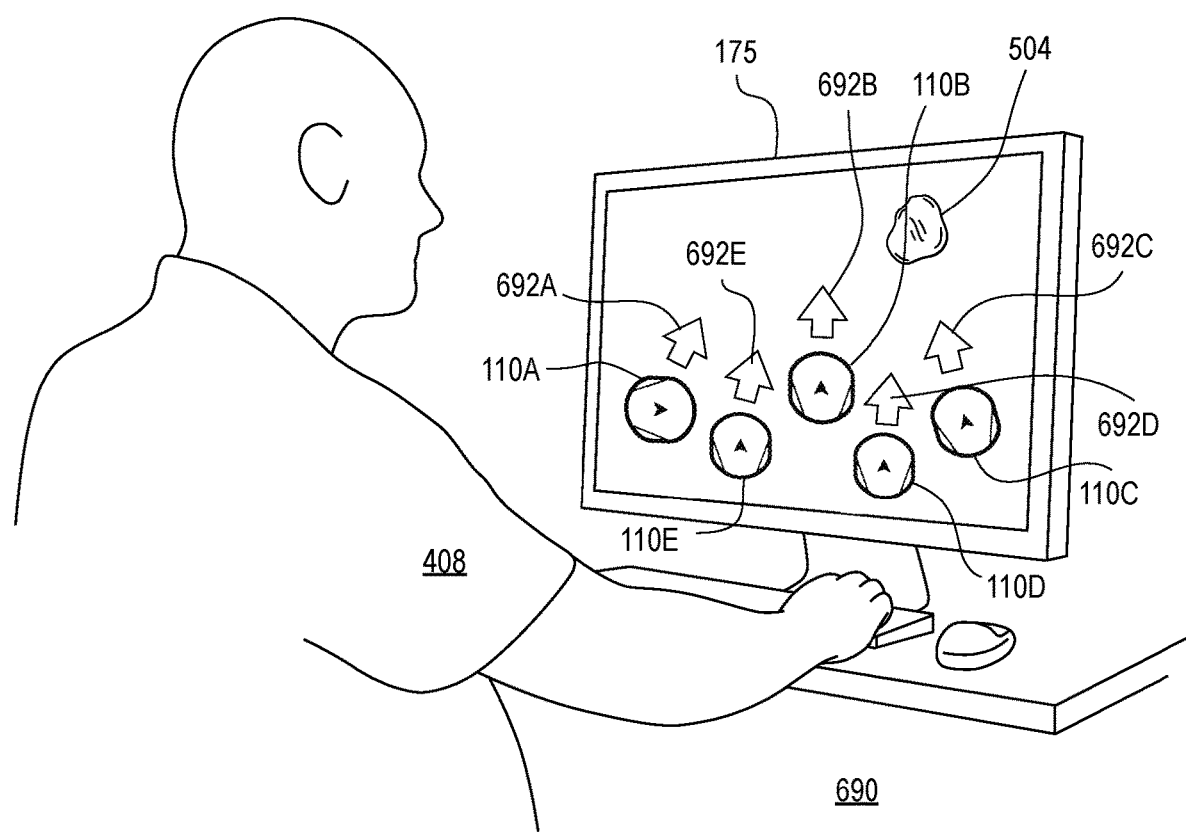

As shown in FIG. 6O, in step 690, the UI 175 displays to the user 508 a UI 175 showing each of the user-selected robots 110A-110E as each approaches the critical condition 504 following respective robot trajectories 692A-692E.

Now with live, continuous data provided using the UI by the server to the user for review, the user should be able to determine the culprit behind the critical condition.

The system may receive from the user, using the UI, additional critical conditions defined to narrow down a root cause of the emergency. For example, the system may receive from the user, using the UI, a request to notify the user whenever a moving object is detected within a selected area. When this condition gets triggered, all nearby robots would collect sensor data, providing the system with a more complete and detailed data set to analyze. Block 690 then terminates the process.

Advantages of embodiments of the invention include that the ability of the system to trigger collection of extra data in the case of a near miss or another similar emergency allows additional data to be gathered pertinent to the near miss, data that would not be recorded using a prior art passive recording system. Accordingly, active sensing according to embodiments of the invention provides more useful data than does passive sensing due to limitations of sensors including one or more of a limited field-of-view, range limitations, bandwidth limitations, and the like.

Another advantage of embodiments of the invention is that compliance of the facility with 5S standards can be promoted by the robotic detection of a moving object in an area in which that type of object is prohibited.

An additional advantage of embodiments of the invention is that the data obtained regarding the number of one or more of humans, forklifts, golf carts, autonomous guided vehicles, autonomous mobile robots and other moving obstacles in the facility can eventually be used to generate better workflows in the facilities to increase one or more of efficiency and throughput.

A still further advantage of embodiments of the invention is that when both the individual robot and one or more robots are streaming data to the cloud in response to the occurrence of the critical condition, the cloud thereby receives a record of the detected critical condition that is one or more of multi-dimensional, more complete and more continuous.

A yet additional advantage of embodiments of the invention is that the generated statistics and/or heat maps can give the facility better information about flow of material. Another advantage of embodiments of the invention is that the generated statistics and/or heat maps can be used to determine inventory areas that are one or more of underutilized areas and obsolete. Accordingly, embodiments of the invention can be used to optimize facility space utilization.

A still additional advantage of embodiments of the invention is that the invention can be used to send a robot to do one monitor a specific area to conduct a security audit. An additional advantage of embodiments of the invention is that while performing another task, the robot can opportunistically look for one or more of emergency exits, fire extinguishers, and the like. According to yet further advantages of embodiments of the invention, the robot can also report to the customer on a state of the one or more of emergency exits, fire extinguishers, and the like.

A yet further advantage of embodiments of the invention is that the filtering settings allow the user to analyze current and historical data in different ways to detect trends and potential trouble spots.

The system and method for facility monitoring and reporting to improve safety using one or more robots includes a plurality of components such as one or more of electronic components, hardware components, and computer software components. A number of such components can be combined or divided in the system. An example component of the system includes a set and/or series of computer instructions written in or implemented with any of a number of programming languages, as will be appreciated by those skilled in the art.

The system in one example employs one or more computer-readable signal-bearing media. The computer-readable signal bearing media store software, firmware and/or assembly language for performing one or more portions of one or more implementations of the invention. The computer-readable signal-bearing medium for the system in one example comprises one or more of a magnetic, electrical, optical, biological, and atomic data storage medium. For example, the computer-readable signal-bearing medium comprises floppy disks, magnetic tapes, CD-ROMs, DVD-ROMs, hard disk drives, downloadable files, files executable "in the cloud," and electronic memory.

For example, it will be understood by those skilled in the art that software used by the system and method for facility monitoring and reporting to improve safety using one or more robots may be located in any location in which it may be accessed by the system. It will be further understood by those of skill in the art that the number of variations of the network, location of the software, and the like are virtually limitless. It is intended, therefore, that the subject matter in the above description shall be interpreted as illustrative and shall not be interpreted in a limiting sense.

While the above representative embodiments have been described with certain components in exemplary configurations, it will be understood by one of ordinary skill in the art that other representative embodiments can be implemented using different configurations and/or different components.

For example, it will be understood by one of ordinary skill in the art that the order of certain steps and certain components can be altered without substantially impairing the functioning of the invention.

The representative embodiments and disclosed subject matter, which have been described in detail herein, have been presented by way of example and illustration and not by way of limitation. It will be understood by those skilled in the art that various changes may be made in the form and details of the described embodiments resulting in equivalent embodiments that remain within the scope of the invention. It is intended, therefore, that the subject matter in the above description shall be interpreted as illustrative and shall not be interpreted in a limiting sense.

It will be understood by those skilled in the art that software used by the method for facility monitoring and reporting to improve safety using one or more robots may be located in any location in which it may be accessed by the system. It will be further understood by those of skill in the art that the number of variations of the network, the location of the software, and the like are virtually limitless.

While the above representative embodiments have been described with certain components in exemplary configurations, it will be understood by one of ordinary skill in the art that other representative embodiments can be implemented using different configurations and/or different components. For example, it will be understood by one of ordinary skill in the art that the order of certain steps and certain components can be altered without substantially impairing the functioning of the invention.

The representative embodiments and disclosed subject matter, which have been described in detail herein, have been presented by way of example and illustration and not by way of limitation. It will be understood by those skilled in the art that various changes may be made in the form and details of the described embodiments resulting in equivalent embodiments that remain within the scope of the invention. It is intended, therefore, that the subject matter in the above description shall be interpreted as illustrative and shall not be interpreted in a limiting sense.

What is claimed is:

1. A method for detecting for facility monitoring and reporting to improve safety using one or more robots, comprising:

using a system comprising a network, the system further comprising a plurality of robots operating in a facility, the robots operably connected to the network, the robots configured to monitor facility operation, the robots further configured to detect a critical condition, wherein the robots are further configured to go into high alert upon detection of the critical condition, the system further comprising a server operably connected to the robots over the network, wherein the robots are configured to regularly produce to the server a regular report under normal operating conditions, wherein the robots are further configured to produce to the server a critical condition report upon occurrence of the critical condition, receiving, by the server, from a detecting robot, a critical condition detected by the detecting robot;

displaying, by the server, on a user interface (UI) visible to a user, the UI operably connected to the server, the critical condition;

switching the detecting robot, by the server, from periodic, lower-priority data recording, to high-priority, real-time, continuous data recording and direct uploading;
sending the critical condition, by the server, to one or more other robots; and
requesting assistance, by the server, for the detecting robot, from the other robots, the method further comprising a step, performed after the requesting assistance step, of:
receiving, by the server, from the determining robot, a determination that one or more of the critical condition and a number of robots near the critical condition is problematic.

2. A method for detecting for facility monitoring and reporting to improve safety using one or more robots, comprising:
using a system comprising a network, the system further comprising a plurality of robots operating in a facility, the robots operably connected to the network, the robots configured to monitor facility operation, the robots further configured to detect a critical condition, wherein the robots are further configured to go into high alert upon detection of the critical condition, the system further comprising a server operably connected to the robots over the network, wherein the robots are configured to regularly produce to the server a regular report under normal operating conditions, wherein the robots are further configured to produce to the server a critical condition report upon occurrence of the critical condition, receiving, by the server, from a detecting robot, a critical condition detected by the detecting robot;
displaying, by the server, on a user interface (UI) visible to a user, the UI operably connected to the server, the critical condition;
switching the detecting robot, by the server, from periodic, lower-priority data recording, to high-priority, real-time, continuous data recording and direct uploading;
sending the critical condition, by the server, to one or more other robots;
requesting assistance, by the server, for the detecting robot, from the other robots;
receiving, by the server, from the determining robot, a determination that one or more of the critical condition and a number of robots near the critical condition is problematic; and
sending, by the server, to one or more other robots, a command blocking the one or more other robots from approaching the critical condition.

3. A method for detecting for facility monitoring and reporting to improve safety using one or more robots, comprising:
using a system comprising a network, the system further comprising a plurality of robots operating in a facility, the robots operably connected to the network, the robots configured to monitor facility operation, the robots further configured to detect a critical condition, wherein the robots are further configured to go into high alert upon detection of the critical condition, the system further comprising a server operably connected to the robots over the network, wherein the robots are configured to regularly produce to the server a regular report under normal operating conditions, wherein the robots are further configured to produce to the server a critical condition report upon occurrence of the critical condition, receiving, by the server, from a detecting robot, a critical condition detected by the detecting robot;
displaying, by the server, on a user interface (UI) visible to a user, the UI operably connected to the server, the critical condition;
switching the detecting robot, by the server, from periodic, lower-priority data recording, to high-priority, real-time, continuous data recording and direct uploading;
sending the critical condition, by the server, to one or more other robots;
requesting assistance, by the server, for the detecting robot, from the other robots;
receiving, by the server, from the determining robot, a determination that one or more of the critical condition and a number of robots near the critical condition is problematic;
sending, by the server, to one or more other robots, a command blocking the one or more other robots from approaching the critical condition; and
receiving, by the server, from a user, an instruction regarding preventive measures to resolve the critical condition.

4. A method for detecting for facility monitoring and reporting to improve safety using one or more robots, comprising:
using a system comprising a network, the system further comprising a plurality of robots operating in a facility, the robots operably connected to the network, the robots configured to monitor facility operation, the robots further configured to detect a critical condition, wherein the robots are further configured to go into high alert upon detection of the critical condition, the system further comprising a server operably connected to the robots over the network, wherein the robots are configured to regularly produce to the server a regular report under normal operating conditions, wherein the robots are further configured to produce to the server a critical condition report upon occurrence of the critical condition, receiving, by the server, from a detecting robot, a critical condition detected by the detecting robot;
displaying, by the server, on a user interface (UI) visible to a user, the UI operably connected to the server, the critical condition;
switching the detecting robot, by the server, from periodic, lower-priority data recording, to high-priority, real-time, continuous data recording and direct uploading;
sending the critical condition, by the server, to one or more other robots;
requesting assistance, by the server, for the detecting robot, from the other robots;
receiving, by the server, from the determining robot, a determination that one or more of the critical condition and a number of robots near the critical condition is problematic;
sending, by the server, to one or more other robots, a command blocking the one or more other robots from approaching the critical condition
receiving, by the server, from a user, an instruction regarding preventive measures to resolve the critical condition; and
implementing, by the server, the user's instruction regarding the preventive measures to resolve the critical condition.

5. A method for detecting for facility monitoring and reporting to improve safety using one or more robots, comprising:

using a system comprising a network, the system further comprising a plurality of robots operating in a facility, the robots operably connected to the network, the robots configured to monitor facility operation, the robots further configured to detect a critical condition, wherein the robots are further configured to go into high alert upon detection of the critical condition, the system further comprising a server operably connected to the robots over the network, wherein the robots are configured to regularly produce to the server a regular report under normal operating conditions, wherein the robots are further configured to produce to the server a critical condition report upon occurrence of the critical condition, receiving, by the server, from a detecting robot, a critical condition detected by the detecting robot;

requesting data regarding the critical condition, by the server, from a robot;

displaying, by the server, on a user interface (UI) visible to a user, the UI operably connected to the server, the critical condition;

generating, by the server, a heat map of the critical condition;

generating, by the server, a path usable by the robots around the critical condition;

switching the detecting robot, by the server, from periodic, lower-priority data recording, to high-priority, real-time, continuous data recording and direct uploading;

sending the critical condition, by the server, to one or more other robots;

requesting assistance, by the server, for the detecting robot, from the other robots;

receiving, by the server, from the determining robot, a determination that one or more of the critical condition and a number of robots near the critical condition is problematic;

sending, by the server, to one or more other robots, a command blocking the one or more other robots from approaching the critical condition;

receiving, by the server, from a user, an instruction regarding preventive measures to resolve the critical condition;

implementing, by the server, the user's instruction regarding the preventive measures to resolve the critical condition;

sending, by the server, to the UI, for display to the user, a robot selection panel comprising a plurality of robots usable to approach the critical condition;

receiving, by the server, from the UI, a user selection of a robot from the robot selection panel; and transmitting, by the server, to each of the user-selected robots, a respective instruction instructing each of the user-selected robots to approach the critical condition.

* * * * *